US008900686B2

(12) United States Patent
Yoshioka et al.

(10) Patent No.: US 8,900,686 B2
(45) Date of Patent: Dec. 2, 2014

(54) MOLDED BODY, AND METHOD FOR PRODUCING THE MOLDED BODY

(75) Inventors: Kunihiko Yoshioka, Nagoya (JP); Kimihisa Kaneko, Nagoya (JP); Makoto Ohmori, Ohbu (JP); Kenji Suzuki, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 213 days.

(21) Appl. No.: 13/167,238

(22) Filed: Jun. 23, 2011

(65) Prior Publication Data
US 2012/0058301 A1 Mar. 8, 2012

(30) Foreign Application Priority Data

Jul. 22, 2010 (JP) ................................. 2010-164507

(51) Int. Cl.
| B28B 1/00 | (2006.01) |
| B28B 1/24 | (2006.01) |
| B28B 7/00 | (2006.01) |
| B28B 19/00 | (2006.01) |
| C04B 37/00 | (2006.01) |

(52) U.S. Cl.
CPC ......... B28B 1/008 (2013.01); *C04B 2235/6023* (2013.01); B28B 1/24 (2013.01); B28B 7/0091 (2013.01); B28B 19/0015 (2013.01); C04B 37/001 (2013.01); *C04B 2235/602* (2013.01); *C04B 2237/68* (2013.01); *C04B 2237/78* (2013.01)
USPC ........ 428/141; 428/174; 428/172; 428/411.1; 428/148; 264/219; 264/241

(58) Field of Classification Search
CPC .................... B29C 43/146; C04B 2235/6023; C04B 2237/68; C04B 2237/78; B28B 1/008; B28B 7/0091
USPC ................... 428/411.1, 141; 264/241
See application file for complete search history.

(56) References Cited

U.S. PATENT DOCUMENTS 6,375,880 B1 * 4/2002 Cooper et al. ................. 264/138
6,528,145 B1 * 3/2003 Berger et al. ................. 428/156
(Continued)

FOREIGN PATENT DOCUMENTS

| GB | 2 357 280 | 6/2001 |
| JP | 07-038159 A1 | 2/1995 |

(Continued)

OTHER PUBLICATIONS

European Search Report, European Patent Application No. 11809533.0, dated Dec. 16, 2013 (5 pages).

*Primary Examiner* — Aaron Austin
*Assistant Examiner* — Jasper Saberi
(74) *Attorney, Agent, or Firm* — Burr & Brown, PLLC

(57) ABSTRACT

A second mold is placed on a planar surface of a first mold to form a first mold cavity, which is filled with a first material slurry containing a first material powder and the molded slurry is caused to set, thereby forming a first molded part on the planar surface of the first mold. A third mold is placed on the planar surface of the first mold from which the second mold is removed and on which the first molded part is formed, thereby forming a second mold cavity. The second mold cavity is filled with a second material slurry which contains a second material powder different from the first material powder so as to mold the slurry in contact with the first molded part. The molded slurry is caused to set, thereby forming a second molded part on the planar surface of the first mold.

8 Claims, 24 Drawing Sheets

(56) References Cited

U.S. PATENT DOCUMENTS

| | | |
|---|---|---|
| 2001/0006451 A1 | 7/2001 | Miyazaki et al. |
| 2003/0232221 A1 | 12/2003 | Yamada et al. |
| 2005/0019553 A1* | 1/2005 | Yamada ................. 428/325 |
| 2005/0212185 A1 | 9/2005 | Miyazawa |
| 2008/0237922 A1* | 10/2008 | Vaidyanathan et al. ...... 264/255 |
| 2009/0226685 A1 | 9/2009 | Yoshioka et al. |
| 2010/0105539 A1* | 4/2010 | Hollingsworth et al. ..... 501/152 |

FOREIGN PATENT DOCUMENTS

| | | |
|---|---|---|
| JP | 2003-176183 A1 | 6/2003 |
| JP | 2009-241456 A1 | 10/2009 |
| WO | 2004/035281 A1 | 4/2004 |
| WO | 2009/110579 A1 | 9/2009 |

* cited by examiner (a)  (b)

(a)　　　　　　　　　(b)

(a)   (b)

(a)　　　　　　　　　　　　　　(b)

(a)  (b)

(a)  (b)

(a)                  (b)

(a)  (b)

(a)

(b)

(a)  (b)

(a)     (b)

(a)   (b)

(a)

(b)

(a)

(b)

«MOLDED BODY, AND METHOD FOR PRODUCING THE MOLDED BODY»

FIELD OF THE INVENTION

The present invention relates to a molded body in a state before being subjected to firing and to a method for producing the molded body.

BACKGROUND OF THE INVENTION

According to a conventional method for producing a molded body in a state before being subjected to firing, a material slurry which contains a material powder, a dispersant, and a gelling agent is molded, and the molded material slurry is caused to set through curing reaction effected by the gelling agent (refer to, for example WO2004/035281), thereby yielding a molded body. A process for producing a molded body through utilization of curing reaction effected by the gelling agent is also called a gel-casting process.

As described in WO2009/110579, the inventors of the present invention propose a method for yielding, by use of the gel-casting process, a molded body in which two kinds of molded parts of different materials are bonded together. According to this method, first, a paste which does not contain a gelling agent is formed into a certain shape and caused to set, thereby forming a first molded part. Next, a material slurry which contains a material powder, a dispersant, and a gelling agent is molded and caused to set in such a manner as to come into contact with the first molded part, thereby forming a second molded part.

In this manner, according to WO2009/110579, the first molded part is formed without use of the gel-casting process, and the second molded part is formed by use of the gel-casting process, thereby yielding a molded body in which two kinds of molded parts of different materials are bonded together.

SUMMARY OF THE INVENTION

The inventors of the present invention have found the possibility of yielding a molded body in which two kinds of molded parts of different materials are bonded together as mentioned above and which is higher in bonding strength between the bonding surfaces of the two kinds of molded parts as compared with a molded body yielded by the method described in WO2009/110579.

A molded body according to the present invention comprises a first molded part formed by molding a first material slurry which contains a first material powder, a dispersant, and a gelling agent, and by causing the molded first material slurry to set, and a second molded part bonded to the first molded part and formed by molding a second material slurry which contains "a second material powder different in material from the first material powder," a dispersant, and a gelling agent, and by causing the molded second material slurry to set. Examples of the first and second material powders include a ceramic powder, a metal powder, etc.

The molded body is produced, for example, as follows. First, a first molded part is formed by molding a first material slurry which contains a first material powder, a dispersant, and a gelling agent, and by causing the molded first material slurry to set. Next, a second molded part is formed by molding a second material slurry which contains "a second material powder different in material from the first material powder," a dispersant, and a gelling agent, in such a manner that the second material slurry comes into contact with the first molded part, and by causing the molded second material slurry to set. This procedure yields the molded body in which the first molded part and the second molded part are bonded together.

The molded body according to the present invention can be configured so as to have a planar surface or a curved surface having a region where the first molded part is exposed, and a region where the second molded part is exposed.

The molded body having such a planar or curved surface can be produced, for example, as follows. First, a second mold is placed on a planar surface or a curved surface of a first mold having the planar surface or the curved surface, thereby forming a first mold cavity. Next, the first mold cavity is filled with a first material slurry which contains a first material powder, a dispersant, and a gelling agent, so as to mold the first material slurry, and the molded first material slurry is caused to set. By this procedure, a first molded part is formed on the planar surface or the curved surface of the first mold. Next, a third mold is placed on the planar surface or the curved surface of the first mold from which the second mold is removed and on which the first molded part is formed, thereby forming a second mold cavity. Next, the second mold cavity is filled with a second material slurry which contains "a second material powder different in material from the first material powder," a dispersant, and a gelling agent, so as to mold the second material slurry in such a manner that the second material slurry comes into contact with the first molded part, and the molded second material slurry is caused to set. By this procedure, a second molded part is formed on the planar surface or the curved surface of the first mold. Thus, there is yielded the molded body in which the first molded part and the second molded part are bonded together and which has a planar surface or a curved surface having a region where the first molded part is exposed, and a region where the second molded part is exposed.

As mentioned above, in production of the molded body according to the present invention, the first molded part is formed by use of the gel-casting process; next, the second molded part is formed also by use of the gel-casting process, in such a manner as to come into contact with the first molded part. Therefore, on the bonding surfaces of the first and second molded parts, a curing reaction can proceed between the second material slurry and an unreacted gelling agent remaining in the first material slurry (the first molded part). As a result, the bonding surfaces of the first and second molded parts can be strongly bonded together, and, as compared with a molded body yielded by the method described in WO2009/110579, the molded body according to the present invention is higher in bonding strength between the bonding surfaces. Additionally, as compared with a fired body yielded by the method described in WO2009/110579, a fired body yielded by firing the molded body having such a high bonding strength between the bonding surfaces is higher in strength and durability.

In the above-mentioned molded body according to the present invention, preferably, a difference in level produced on the planar or curved surface in a region corresponding to the boundary between the first molded part and the second molded part is 20 times or less a median diameter of particles of the first material powder contained in the first molded part or a median diameter of particles of the second material powder contained in the second molded part, whichever is greater. Alternatively, preferably, the difference in level produced on the planar or curved surface in a region corresponding to the boundary between the first molded part and the second molded part is 6 times or less a roughness parameter Rz of a region, corresponding to the first molded part, of the planar or curved surface or a roughness parameter Rz of a region, corresponding to the second molded part, of the planar or curved surface, whichever is greater.

Generally, a difference in level is unavoidably formed on the planar or curved surface in a region corresponding to the boundary between the first and second molded parts. When the difference in level falls within the above-mentioned ranges, the bonding strength between the bonding surfaces of the first and second molded parts has been found to be sufficiently high (this will be described in detail later).

The above-mentioned molded body according to the present invention may further comprise a third molded part bonded to one or both of the first and second molded parts and formed by molding a third material slurry which contains a third material powder different in material from the first and second material powders, a dispersant, and a gelling agent, and by causing the molded third material slurry to set.

In this case, the third molded part can be formed by molding the third material slurry which contains the third material powder different in material from the first and second material powders, the dispersant, and the gelling agent, in such a manner that the third material slurry comes into contact with one or both of the first and second molded parts, and by causing the molded third material slurry to set.

In the case where the third molded part is provided as mentioned above, and the molded body has a planar surface or a curved surface having a region where the first molded part is exposed, and a region where the second molded part is exposed, preferably, the third molded part is bonded to a side surface of a bonded body consisting of the first and second molded parts, the side surface being different from the planar surface or the curved surface.

Thus, for example, in the case where a fired body obtained through firing of the molded body is to be used in a circuit substrate, an electronic component, etc., and any one of the first to third molded parts is a precursor of a conductor (the precursor will become a conductor through firing), the degree of freedom in designing the pattern of the conductor increases. Also, in the case where a fired body obtained through firing of the molded body is to be used in MEMS, μTAS, a microreactor, etc., the degree of freedom in designing a flow channel for fluid increases.

DETAILED DESCRIPTION OF THE INVENTION

Molded bodies according to embodiments of the present invention and methods for producing the molded bodies wilt next be described with reference to the drawings.

First Embodiment

Figure 1:
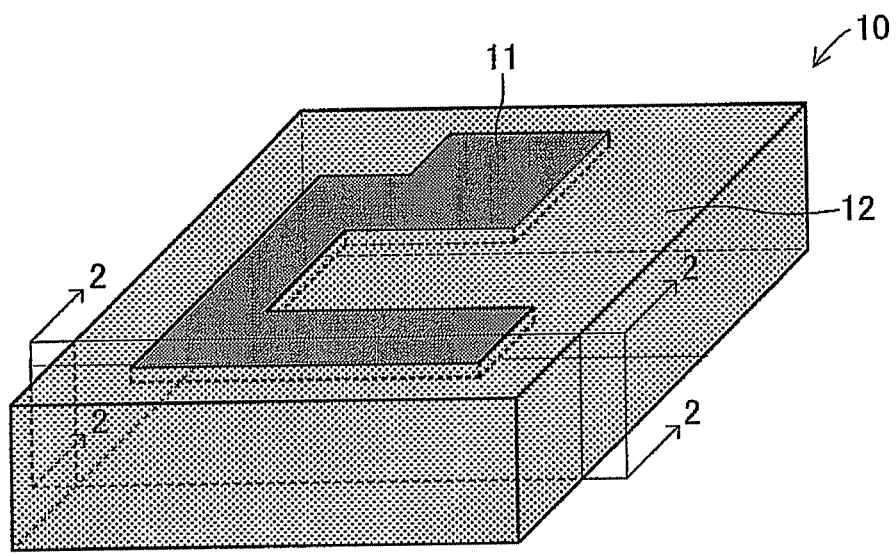
FIG. 1 Perspective view showing an entire molded body according to a first embodiment of the present invention.
Figure 2:
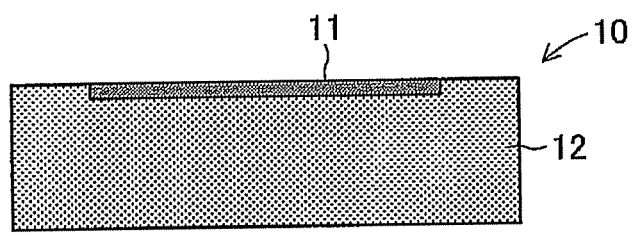
FIG. 2 Sectional view showing the molded body taken along line 2-2 of FIG. 1.

FIG. 1 is a perspective view showing the entirety of a molded body 10 according to a first embodiment of the present invention as viewed before being subjected to firing. FIG. 2 is a sectional view taken along line 2-2 of FIG. 1. The molded body 10 assumes the form of a small rectangular parallelepiped having a rectangular planar shape (a shape as viewed from above), about 10 mm on a side, and a thickness of about 1 mm. The molded body 10 consists of a first molded part 11 (dotted dark), which is a precursor of a conductor, and a second molded part 12 (dotted light), which is a precursor of an insulator.

The second molded part 12 assumes the form of a rectangular parallelepiped substantially identical with the entire shape of the molded body 10. The first molded part 11 assumes the form of a very thin plate having a planar shape of a predetermined pattern and a thickness of about 0.1 mm. The first molded part 11 is embedded in and bonded to an upper surface portion of the second molded part 12. No difference in level exists between the upper surface of the first molded part 11 and the upper surface of the second molded part 12 (in actuality, as will be described later, a small difference in level unavoidably exists). That is, the upper surface of the first molded part 11 and the upper surface of the second molded part 12 form a single plane (i.e., the upper surface of the molded body 10 in the form of a rectangular parallelepiped). In other words, the molded body 10 has a plane having a region where the first molded part 11 is exposed, and a region where the second molded part 12 is exposed.

The molded body 10 will be fired later. By this firing process, the first molded part 11 becomes a conductor having the same shape, and the second molded part 12 becomes an insulator having the same shape. That is, there is yielded a fired body in which a conductor is embedded in an upper surface portion of an insulator in the form of a rectangular parallelepiped. The fired body or its processed article can be used as, for example, a ceramic wiring substrate.

Figure 3:
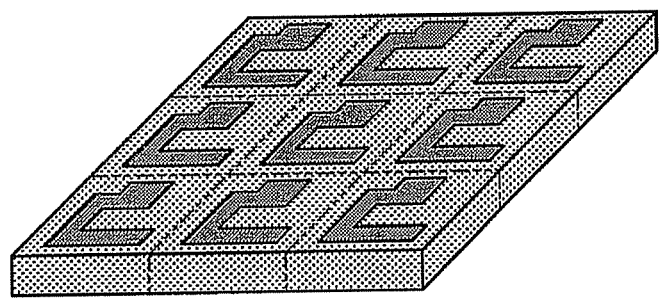
FIG. 3 Perspective view showing an entire molded body formed in simultaneously producing a plurality of the molded bodies shown in FIG. 1.

Next, a method for producing the molded body 10 shown in FIGS. 1 and 2 will be described with reference to FIGS. 4 to 8. For convenience of description, FIGS. 4 to 8 exemplify one-by-one production of the molded body 10 (example of production of a single molded body 10). In actuality, as shown in FIG. 3, a plurality of the molded bodies 10 can be simultaneously produced. In the example shown in FIG. 3, in a single large molded body in the form of a rectangular parallelepiped, nine molded bodies 10 are simultaneously produced in such a condition that they are arrayed a predetermined distance apart from one another in a 3×3 matrix. The single large molded body is cut along cutting lines represented by long-dash-dot-dot lines in FIG. 3, whereby the molded bodies 10 are cut out individually; i.e., nine molded bodies 10 are yielded.

First, molds A, B, C, and D (see FIGS. 4 to 8) made of an aluminum alloy (e.g., duralumin) are prepared for use in production of the molded body 10. The mold A corresponds to the "first mold"; the mold B corresponds to the "second mold"; and the molds C and D correspond to the "third mold." The molds A, B, and D assume the form of a thin rectangular parallelepiped. The mold B has, on its lower surface, a depression (recess) having the same shape as that of the first molded part 11. The mold C is a rectangular-parallelepiped frame which has a window extending therethrough in the vertical direction and having the same rectangular planar shape as that of the second molded part 12. The upper surface (planar surface) of the mold A, the surface of the depression in the lower surface of the mold B, the inner side surface of the mold C, and the lower surface (planar surface) of the mold D correspond to "molding surfaces" for forming the molded body 10. Although unillustrated, the molds has a runner for injecting a slurry, a gate for introducing the injected slurry into a mold cavity, a vent for discharging air from the mold cavity during injection of the slurry, etc.

Next, a mold release agent is applied to the "molding surfaces" of the molds A, B, C, and D, thereby forming a nonadhesive film. The film is formed for facilitating separation (release) of a molded body formed on the "molding surfaces" from the "molding surfaces." The film can be of fluororesin, a silicone resin, a fluorine compound, a silicone compound, etc., and can be formed by plating, CVD, PVD, etc.

Figure 4:
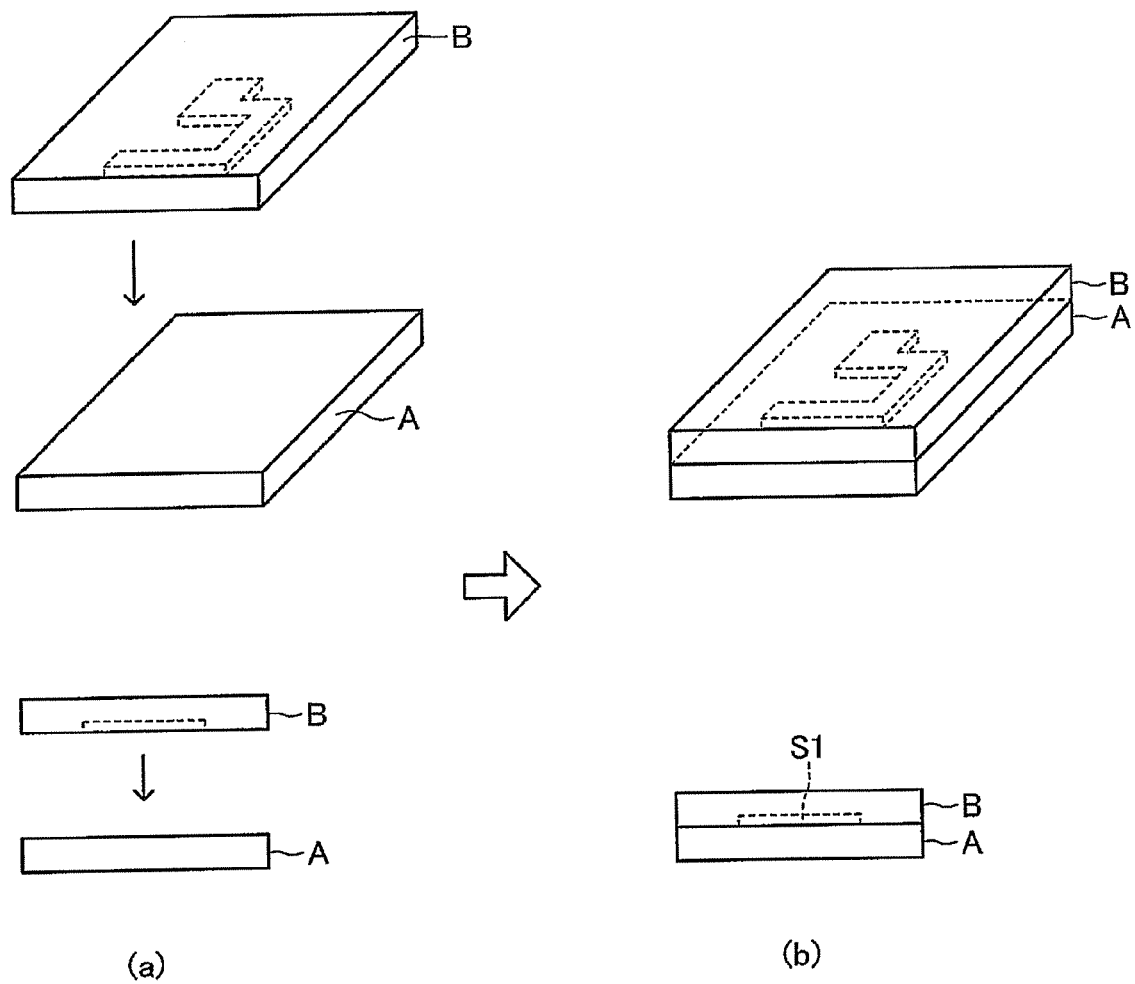
FIG. 4 First view for explaining a step of producing the molded body shown in FIG. 1.

Next, as shown in FIGS. 4(*a*) and 4(*b*), the mold B is placed (overlaid) on the upper surface (molding surface) of the mold A. By this operation, the "molding surfaces" of the molds A and B define a first mold cavity S1. The first mold cavity S1 has the same shape as that of the first molded part 11.

Next, a first material slurry used to form the first molded part 11 is prepared. The first material slurry contains a conductor powder (material powder), a dispersant, and a gelling agent. If necessary, the first material slurry further contains a dispersion aid and a catalyst. Specifically, the first material slurry may be prepared by mixing the following substances: a metal powder, such as a silver powder, a platinum powder, a gold powder, or a palladium powder, serving as the conductor powder; 27 parts by weight of a mixture of an aliphatic polyvalent ester and a polybasic acid ester, and 0.3 parts by weight of ethylene glycol, collectively serving as the dispersant; 3 parts by weight of polycarboxylic acid copolymer, serving as the dispersion aid; 5.3 parts by weight of modified polymethylene polyphenyl polyisocyanate, serving as the gelling agent; and 0.05 parts by weight of 6-dimethylamino-1-hexanol, serving as the catalyst. A material which cures through curing reaction (a chemical reaction typified by urethane reaction) may be used as the gelling agent (the same is applied to a gelling agent appearing later).

Figure 5:
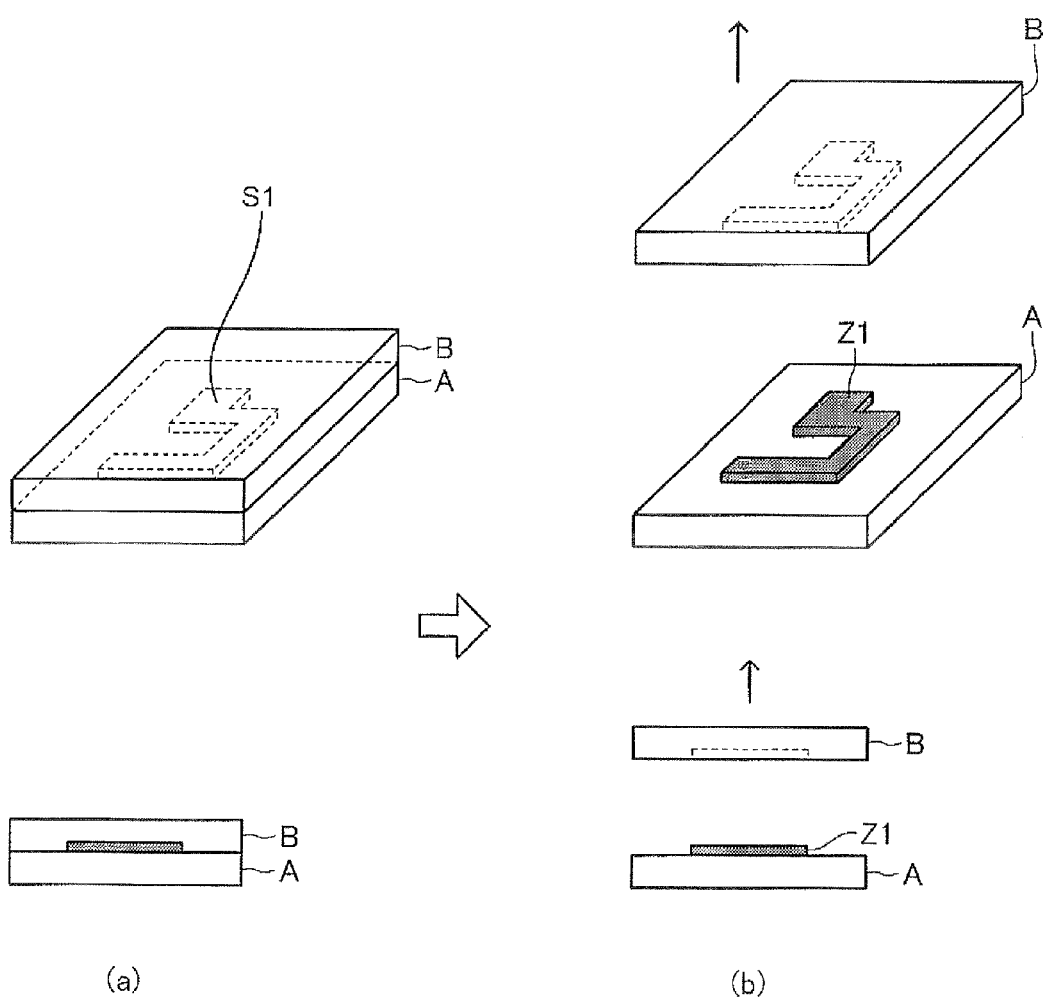
FIG. 5 Second view for explaining a step of producing the molded body shown in FIG. 1.

Next, as shown in FIG. 5(*a*), the prepared first material slurry is filled into the first mold cavity S1. This forms the first material slurry into the same shape as that of the first molded part 11. The molded first material slurry is caused to set through curing reaction effected by the gelling agent. As a result, a first molded body (before drying) Z1 in a state of adhesion to the molds A and B is yielded within the first mold cavity S1.

Next, as shown in FIG. 5(*b*), the mold B is removed from the first molded body (before drying) Z1 in a state of adhesion to the molds A and B. Thus, the first molded body (before drying) Z1 in a state of adhesion to the mold A only is yielded by a gel-casting process. In this condition, conceivably, a portion of the gelling agent contained in the first material slurry remains unreacted within the first molded body (before drying) Z1.

Figure 6:
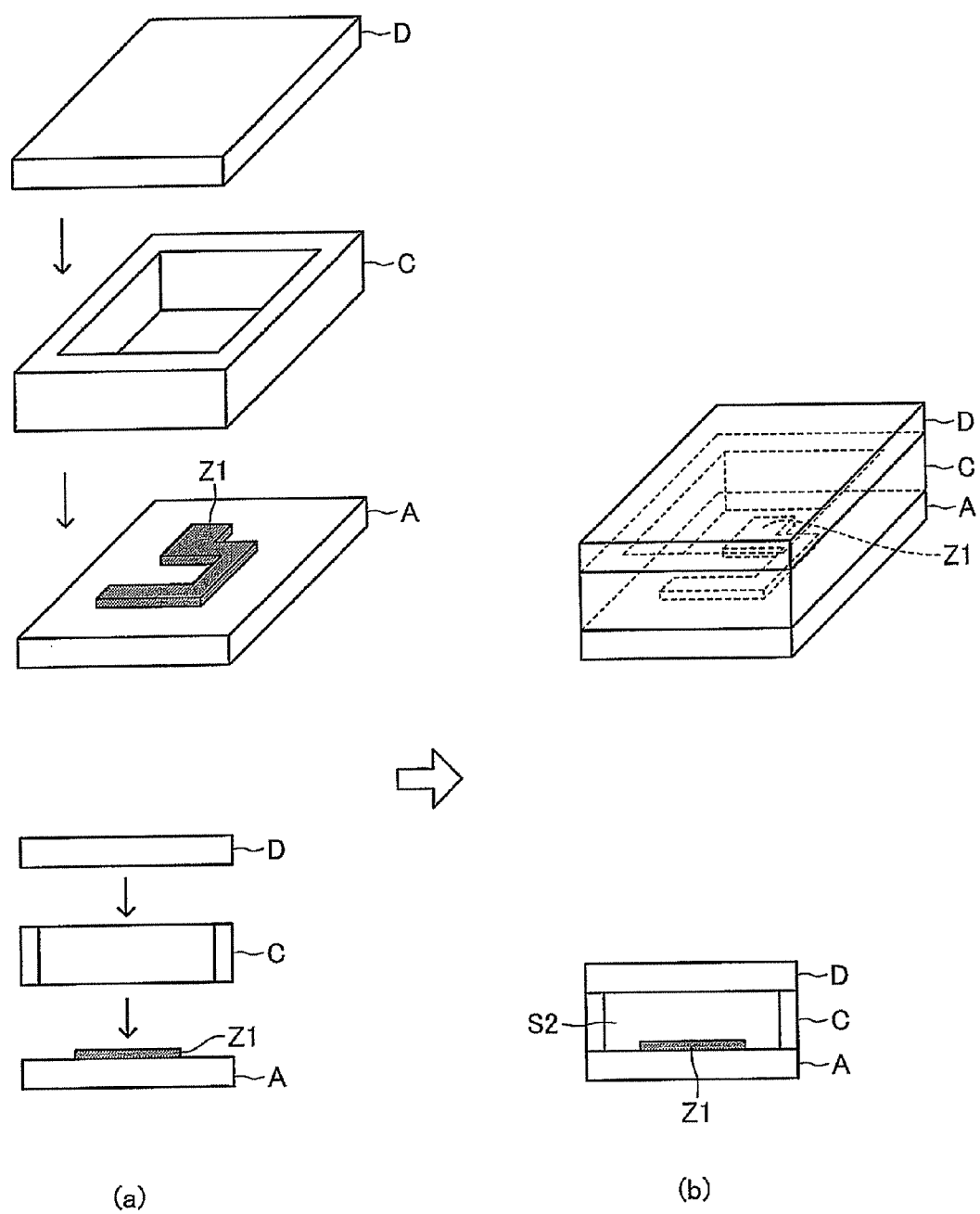
FIG. 6 Third view for explaining a step of producing the molded body shown in FIG. 1.
Figure 7:
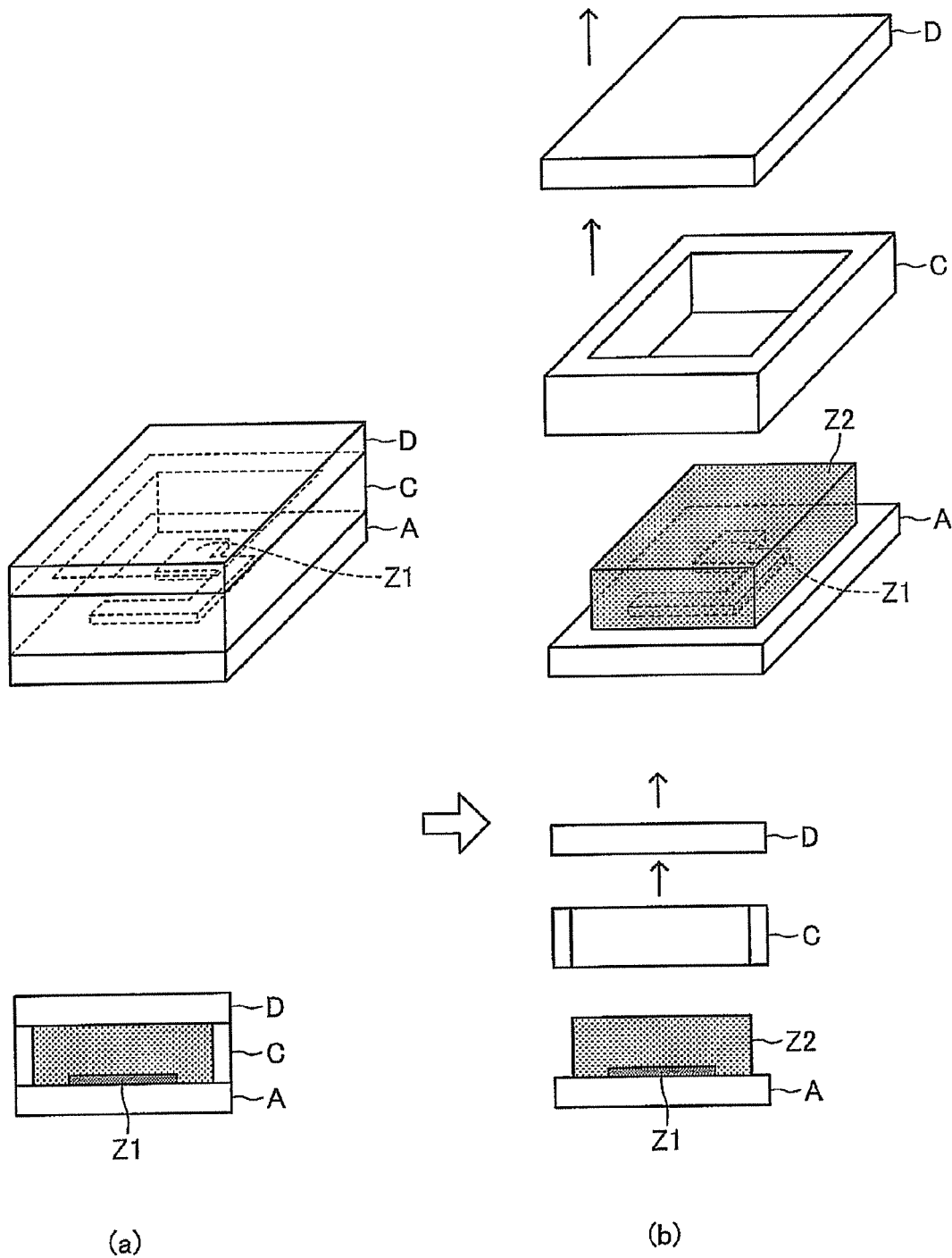
FIG. 7 Fourth view for explaining a step of producing the molded body shown in FIG. 1.
Figure 8:
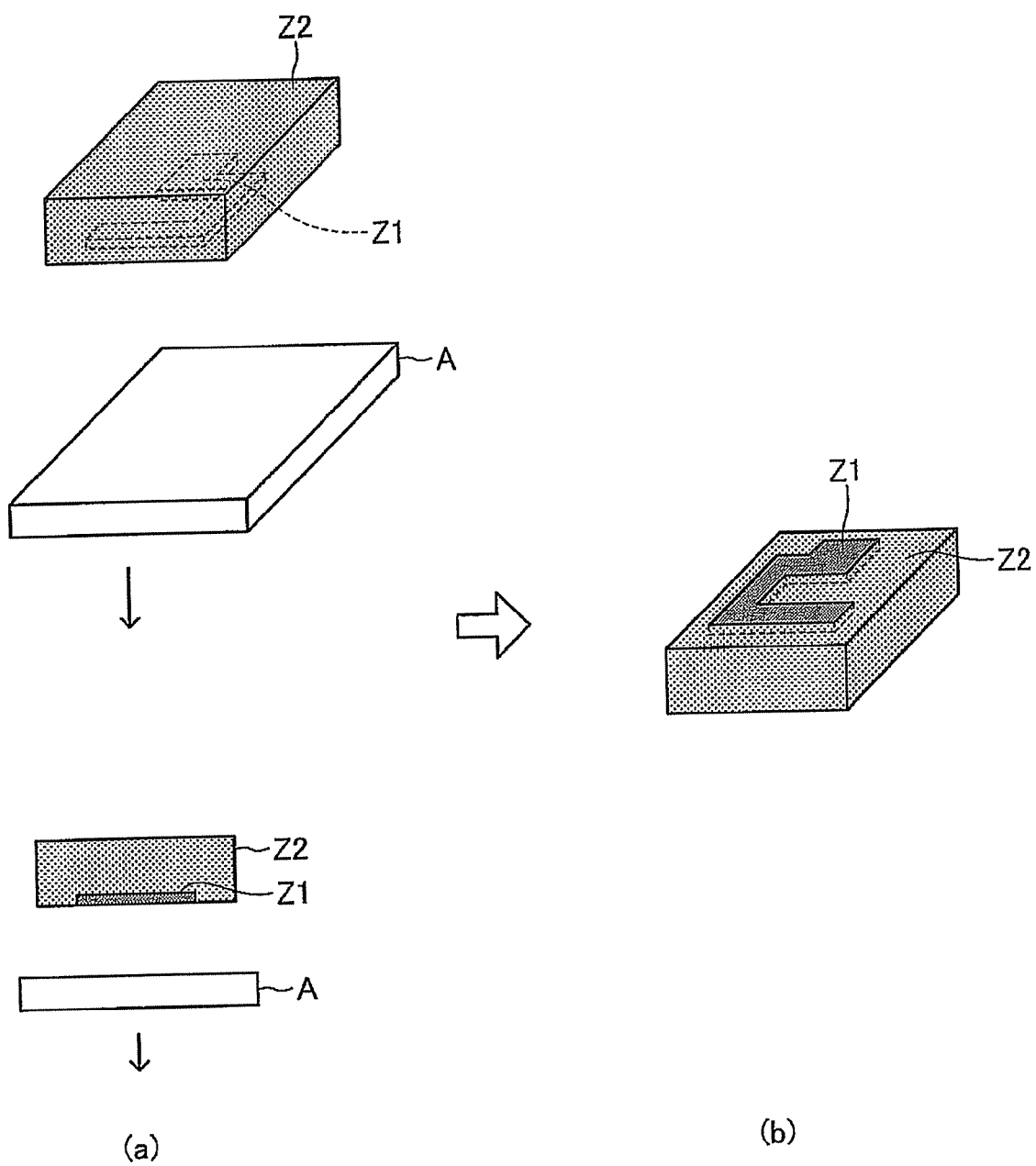
FIG. 8 Fifth view for explaining a step of producing the molded body shown in FIG. 1.

Next, as shown in FIGS. 6(*a*) and 6(*b*), the molds C and D are placed (overlaid) sequentially on the upper surface (molding surface) of the mold A to which the first molded body (before drying) Z1 adheres. By this operation, the "molding surfaces" of the molds A, C, and D define a second mold cavity 82. The second mold cavity S2 has the same shape as that of the second molded part 12.

Next, a second material slurry used to form the second molded part 12 is prepared. The second material slurry contains an insulator powder (material powder), a dispersant, and a gelling agent. If necessary, the second material slurry further contains a dispersion aid and a catalyst. Specifically, the second material slurry may be prepared by mixing the following substances: a ceramic powder, such as a zirconia powder, an alumina powder, a barium titanate powder, a ferrite powder, a quartz powder, a nickel oxide powder, or a yttria powder, serving as the insulator powder; 27 parts by weight of a mixture of an aliphatic polyvalent ester and a polybasic acid ester, and 0.3 parts by weight of ethylene glycol, collectively serving as the dispersant; 3 parts by weight of polycarboxylic acid copolymer, serving as the dispersion aid; 5.3 parts by weight of modified polymethylene polyphenyl polyisocyanate, serving as the gelling agent; and 0.05 parts by weight of 6-dimethylamino-1-hexanol, serving as the catalyst.

Next, as shown in FIG. 7(a), the prepared second material slurry is filled into the second mold cavity S2. This forms the second material slurry into the same shape as that of the second molded part 12 in such a manner that the second material slurry comes into contact with the first molded body (before drying) Z1. The molded second material slurry is caused to set through curing reaction effected by the gelling agent. As a result, a second molded body (before drying) Z2 in a state of adhesion to the molds A, C, and D is yielded, within the second mold cavity S2, in such a condition as to be bonded to the first molded body (before drying) Z1.

Next, as shown in FIG. 7(b), the molds C and D are removed from a bonded body consisting of the first and second molded bodies (before drying) Z1 and Z2 in a state of adhesion to the molds A, C, and D. Thus, similar to the case of the first molded body (before drying) Z1, the second molded body (before drying) Z2 in a state of adhesion to the mold A only is yielded by a gel-casing process.

Next, as shown in FIG. 8(a), the mold A is removed from the bonded body consisting of the first and second molded bodies (before drying) Z1 and Z2. As shown in FIG. 8(b), this yields singly the bonded body consisting of the first and second molded bodies (before drying) Z1 and Z2. FIG. 8(b) shows, in a vertically inverted manner, the bonded body consisting of the first and second molded bodies (before drying) Z1 and Z2 from which the mold A has been removed as shown in FIG. 8(a).

Next, the thus-yielded bonded body consisting of the first and second molded bodies (before drying) Z1 and Z2 is dried by one of known methods. As a result, the first and second molded bodies (before drying) Z1 and Z2 are dried to become the first and second molded parts 11 and 12. That is, there is yielded "the molded body 10 in which the first molded part 11 is embedded in an upper surface portion of the second molded part 12" shown in FIG. 1.

As mentioned above, the molded body 10 is then fired. This yields "a fired body in which a conductor is embedded in an upper surface portion of an insulator in the form of a rectangular parallelepiped." This fired body or its processed article can be used as, for example, a ceramic wiring substrate.

(Actions and Effects)

In the above-mentioned molded body 10 according to the first embodiment of the present invention, the first molded part 10 (to be precise, the first molded body (before drying) Z1) is formed by use of a gel-casting process. Next, the second molded part 12 (to be precise, the second molded body (before drying) Z2) is formed also by use of the gel-casting process in such a manner as to come into contact with the first molded part 10 (to be precise, the first molded body (before drying) Z1). Therefore, on the bonding surfaces of the first and second molded parts 11 and 12 (to be precise, the bonding surfaces of the first and second molded bodies (before drying) Z1 and Z2), a curing reaction can occur between the second material slurry and an unreacted gelling agent remaining in the first material slurry.

As a result, the bonding surfaces of the first and second molded parts 11 and 12 (to be precise, the bonding surfaces of the first and second molded bodies (before drying) Z1 and Z2) can be strongly bonded together. Thus, as compared with the molded body yielded by the method described in WO2009/110579, the bonding strength between the bonding surfaces is higher. That is, there is yielded a molded body in which two kinds of molded parts of different materials are bonded together with a high bonding strength between the bonding surfaces of the two kinds of molded parts. Additionally, by firing the molded body having such a high bonding strength between the bonding surfaces, a fired body having high strength and durability can be yielded.

Next, there will be additionally described conditions required for attaining a sufficiently high bonding strength between the bonding surfaces of the first and second molded parts 11 and 12 in a fired body yielded by firing the molded body. Conceivable causes for shrinkage of the first and second molded bodies Z1 and Z2 are the above-mentioned "curing reaction" effected by the gelling agent and "drying" associated with vaporization of the dispersant.

In a "molding step" (specifically, a step shown in FIG. 5(a) and a step shown in FIG. 7(a)), since a molded body is sealed in a mold, the dispersant hardly evaporates. Therefore, the shrinkage of the molded body in the "molding step" is conceived to be caused mainly by "curing reaction." The shrinkage of the molded body caused by "curing reaction" progresses markedly immediately after start of molding and then gradually decelerates.

Meanwhile, in a "drying step" (specifically, a step shown in FIG. 8(b) after mold release, the molded body has been cured to such an extent as to be able to endure mold release. In other words, "curing reaction" has progressed sufficiently, and the shrinkage of the molded body associated with "curing reaction" is almost completed. Therefore, the shrinkage of the molded body in the "drying step" is conceived to be caused mainly by "drying."

The shrinkage of the molded body caused by "curing reaction" in the "molding step" is discussed. The second molded body Z2 is greater than the first molded body Z1 in the amount of shrinkage caused by "curing reaction" in a period of time from "start of molding of the second molded body Z2" to "completion of curing of the bonded body consisting of the first and second molded bodies Z1 and Z2 (start of the drying process)." This is based on the fact that, in the stage of "start of molding of the second molded body Z2," the first molded body Z1 has already been cured to such an extent as to be able to endure mold release (i.e., the shrinkage of the first molded body Z1 caused by "curing reaction" is substantially completed). That is, since the molding step for the second molded body Z2 starts after completion of the molding step for the first molded body Z1, the shrinkage of the second molded body Z2 caused by "curing reaction" starts and progresses after the shrinkage of the first molded body Z1 caused by "curing reaction" has been substantially completed.

In the bonded body consisting of the first and second molded bodies Z1 and Z2, the amount of shrinkage of each of the first and second molded bodies Z1 and Z2 is the sum of the amount of shrinkage caused by "curing reaction" (the amount of curing shrinkage) and the amount of shrinkage caused by "drying" (the amount of drying shrinkage). Thus, if the first and second material slurries have the same properties (shape and size of particles of a ceramic powder, contents of organic components, etc.), the above-mentioned "difference in the amount of curing shrinkage" causes a small difference in level to arise in a region, corresponding to the boundary between the first and second molded parts 11 and 12, of the surface of "the molded body 10 consisting of the first and second molded parts 11 and 12" yielded after completion of the drying process, in such a manner that the first molded part 11 protrudes relative to the second molded part 12.

However, in actuality, since the first and second material slurries have different properties, the first and second molded bodies Z1 and Z2 differ from each other in the amount of curing shrinkage and in the amount of drying shrinkage. Therefore, the difference in level does not necessarily arise in the boundary region in such a manner that the first molded part 11 protrudes, but the difference in level could arise in such a manner that the second molded part 12 protrudes.

The degree of shrinkage during firing also differs between the first and second molded parts 11 and 12. However, in order to restrain the generation of residual stress caused by integration through firing, adjustment is made such that the first and second molded parts 11 and 12 have substantially the same amount of shrinkage (amount of firing shrinkage). Thus, the form of the difference in level (which of the first and second molded parts protrudes) appearing (in the molded body) before firing remains intact after firing (in the fired body).

The inventors of the present invention have found a strong correlation between the magnitude of the difference in level appearing in the aforementioned region and the bonding strength between "the bonding surfaces of the first and second molded parts 11 and 12."

Figure 9:
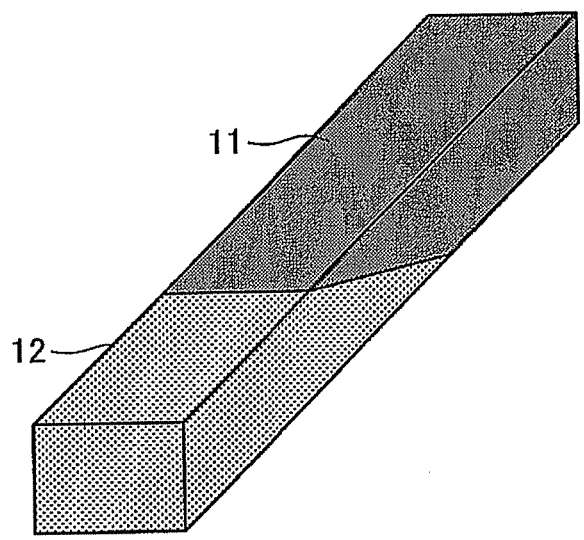
FIG. 9 Perspective view showing a test sample of a fired body (yielded by firing a molded body) for use in evaluating the bonding strength between the bonding surfaces of first and second molded parts.
Figure 10:
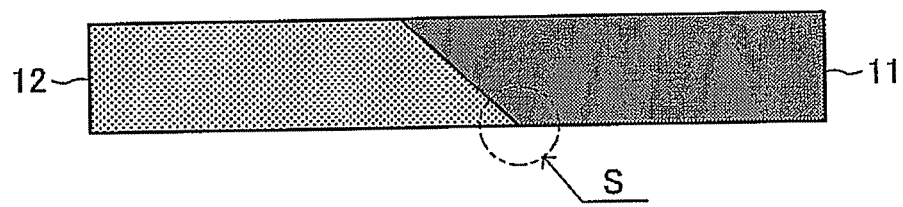
FIG. 10 Front view showing the test sample of the fired body shown in FIG. 9.

Next, a test which was conducted for verifying the above correlation is described below. FIGS. 9 and 10 show an example test sample of a fired body (yielded by firing the molded body) used in the test. This example employed a rectangular-parallelepiped molded body configured such that the first molded part 11 having a 45°-sloped end surface, which serves as a bonding surface, and the second molded part 12 having a 45°-sloped end surface, which serves as a bonding surface, are bonded together by bonding the bonding surfaces together.

Figure 11:
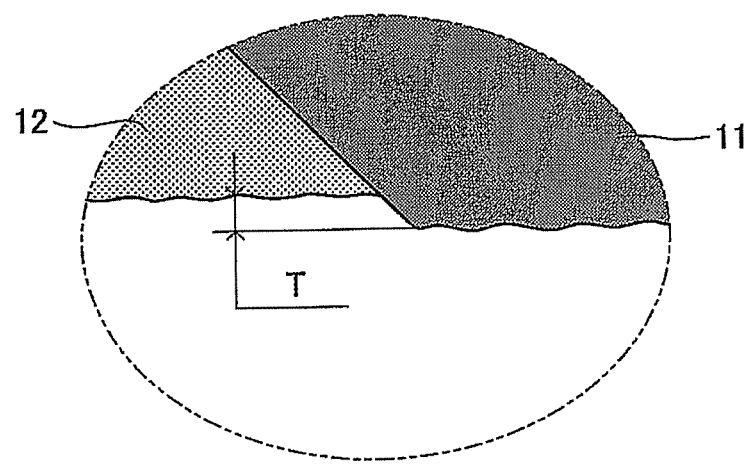
FIG. 11 Enlarged view showing a region S of FIG. 10.

Similar to the first embodiment described above, this molded body was also produced as follows: the first molded part 11 was formed by use of a gel-casting process; subsequently, the second molded part 12 was formed by use of the gel-casting process. As shown in FIG. 11, which shows, on an enlarged scale, a region S of FIG. 10, in the molded body, a small difference in level is formed in a region, corresponding to the boundary between the first and second molded parts 11 and 12, of the surface of the molded body (fired body), in such a manner that the first molded part 11 protrudes relative to the second molded part 12.

Figure 12:
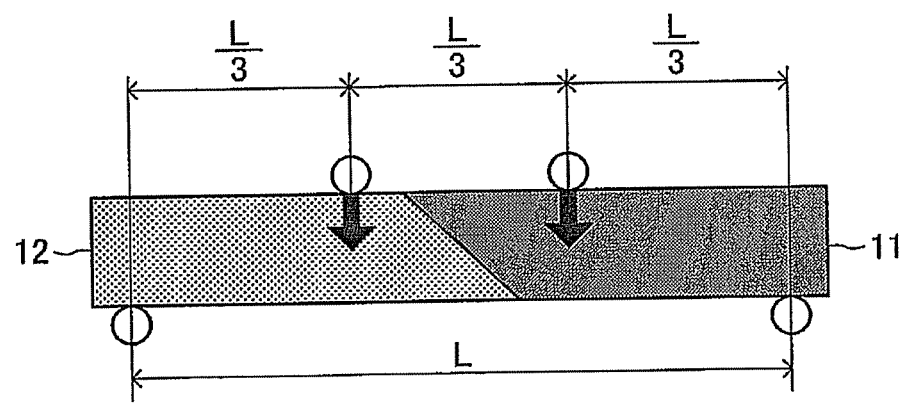
FIG. 12 View showing how a 4-point bending test is conducted on the test sample of the fired body shown in FIG. 9.
Figure 13:
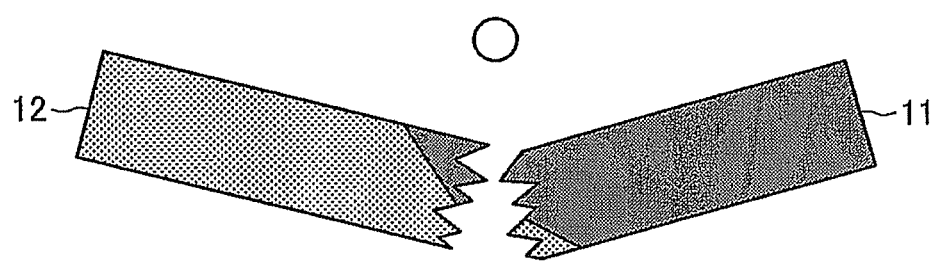
FIG. 13 View showing an example of fracture of a fired body whose bonding strength is sufficiently high.
Figure 14:
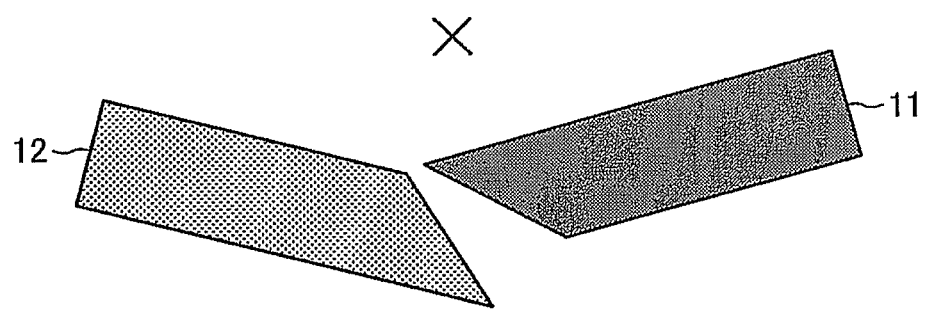
FIG. 14 View showing an example of fracture of a fired body whose bonding strength is not sufficiently high.

As shown in FIG. 12, the test (so-called the "4-point bending test") was conducted as follows: load was applied from above to a fired body shown in FIGS. 9 and 10 and supported at its opposite ends, at two positions indicated by the black arrows so as to break the fired body. The fracture surfaces of the fired bodies broken by the 4-point bending test were evaluated as follows: when the fracture surface was formed in such a manner as to traverse the bonding surfaces as shown in FIG. 13, the fracture surface was judged "Good," indicating that "sufficient bonding strength was provided," and, when the fracture surface was formed in such a manner as to follow the bonding surfaces as shown in FIG. 14, the fracture surface was judged "Poor," indicating that "sufficient bonding strength failed to be provided."

In discussion of the magnitude of the difference T in level (see FIG. 11), the following comparative parameters are employed: "a median diameter d of particles of the first material powder contained in the first molded part 11 or a median diameter d of particles of the second material powder contained in the second molded part 12, whichever is greater" (hereinafter, called "max(d)"), and "a roughness parameter Rz of a region, corresponding to the first molded part 11, of the surface of the fired body or a roughness parameter Rz of a region, corresponding to the second molded part 12, of the surface of the fired body, whichever is greater" (hereinafter, called "max(Rz)").

In the present example, the "median diameter" is defined as follows: when particles of a powder are divided into a group in which particle sizes are smaller than a "threshold value" and a group in which particle sizes are greater than the "threshold value," and the groups have the same amount (weight) of particles, the "threshold value" is the "median diameter." Also, in the present example, the "roughness parameter Rz" is a value defined by JIS B0601:2001 (ISO 4287: 1997). This test employed regions, corresponding to the first and second molded parts 11 and 12, of the lower surface (i.e., the surface subjected to tensile stress) of the rectangular-parallelepiped fired body shown in FIG. 12 for measuring the surface roughness parameters Rz of the first and second molded parts 11 and 12.

There were fabricated a plurality of test samples (fired bodies) which differed in a combination of values of the difference T in level, max(d), and max(Rz). The test samples were subjected to the above-mentioned "4-point bending test" and were observed for fracture surfaces. Table 1 shows the test results. The difference T in level appearing in Table 1 is the maximum value in a dispersion range of the difference T in level in each of the test samples.

TABLE 1

| Sample No. | Powder median dia. d (μm) | | T/max (d) | Surface roughness Rz (μm) | | T/max (Rz) | Difference T in level (μm) | Evaluation of fracture surface |
| --- | --- | --- | --- | --- | --- | --- | --- | --- |
| | First material | Second material | | First molded body | Second molded body | | | |
| 1 | 0.63 | 0.61 | 19 | 3.2 | 3.1 | 4 | 12 | Good |
| 2 | 0.28 | 0.61 | 13 | 2.2 | 3.0 | 3 | 8 | Good |
| 3 | 0.45 | 0.50 | 28 | 4.8 | 4.7 | 3 | 14 | Good |
| 4 | 0.45 | 0.50 | 20 | 1.4 | 1.4 | 7 | 10 | Good |
| 5 | 0.63 | 0.50 | 19 | 3.2 | 3.0 | 4 | 12 | Good |
| 6 | 0.50 | 0.63 | 14 | 3.3 | 3.5 | 3 | 9 | Good |
| 7 | 0.63 | 0.28 | 21 | 3.3 | 3.0 | 4 | 13 | Good |
| 8 | 0.50 | 0.28 | 20 | 2.5 | 2.3 | 4 | 10 | Good |
| 9 | 0.61 | 0.45 | 20 | 2.4 | 2.3 | 5 | 12 | Good |
| 10 | 0.45 | 0.28 | 24 | 2.3 | 2.0 | 5 | 11 | Good |
| 11 | 0.63 | 0.61 | 32 | 2.3 | 2.1 | 9 | 20 | Poor |
| 12 | 0.45 | 0.28 | 24 | 1.3 | 1.2 | 8 | 11 | Poor |

As is understood from Table 1, when the difference T in level exceeds 20 times max(d) and also 6 times max (Rz), a sufficient bonding strength is not provided (see sample Nos. 11 and 12). By contrast, when the difference T in level is 20 times or less max(d) or 6 times or less max(Rz), a sufficient bonding strength is provided (see sample Nos. 1 to 10). In Table 1, "shaded cells" indicate that T is in excess of 20 times max(d) or in excess of 6 times max (Rz).

Thus, in order to attain a sufficiently high bonding strength between the bonding surfaces of the first and second molded parts 11 and 12 in a fired body yielded by firing a molded body, it can be said to be preferred that the difference T in level is 20 times or less max(d), or that the difference T in level is 6 times or less max(Rz).

Second Embodiment

Next, a second embodiment of the present invention will be described with reference to FIGS. 15 to 20. As is understood from FIGS. 15 and 16 corresponding to FIGS. 1 and 2, respectively, the second embodiment differs from the above-described first embodiment only in that a third molded part 13 is further bonded to a side surface (more specifically, a side surface of the second molded part 12, or a surface different from the aforementioned "planar surface" including a region where the first molded part 11 is exposed, and a region where the second molded part 12 is exposed) of the molded body 10. Members of the second embodiment corresponding to those of the first embodiment described above are denoted by the same reference numerals as those used in the first embodiment (the same is applied to modified embodiments to be described later).

Figure 15:
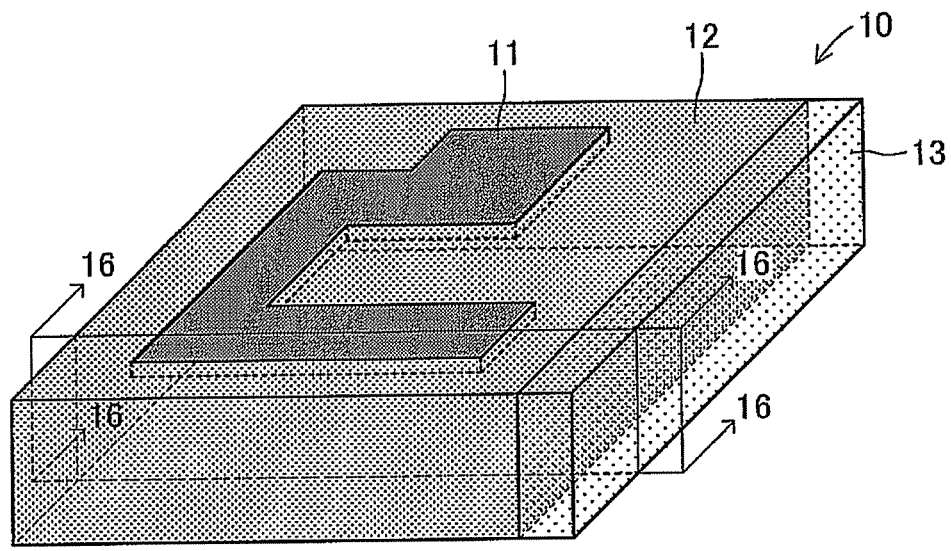
FIG. 15 View, corresponding to FIG. 1, showing a molded body according to a second embodiment of the present invention.
Figure 16:
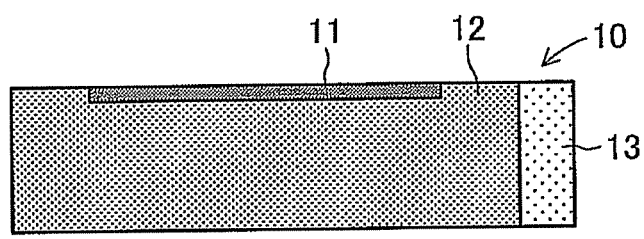
FIG. 16 Sectional view showing the molded body taken along line 16-16 of FIG. 15.
Figure 17:
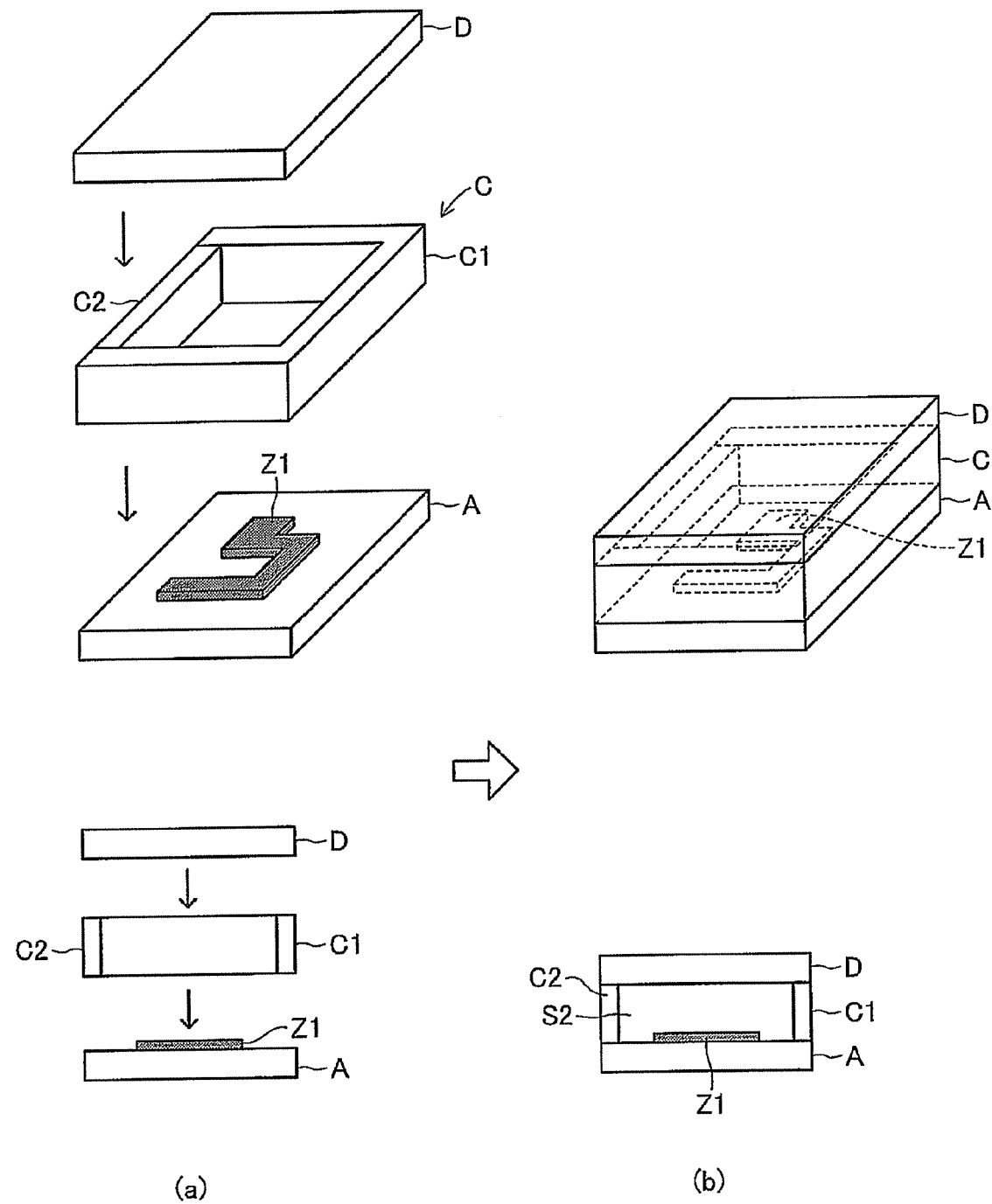
FIG. 17 First view for explaining a step of producing the molded body shown in FIG. 15.
Figure 18:
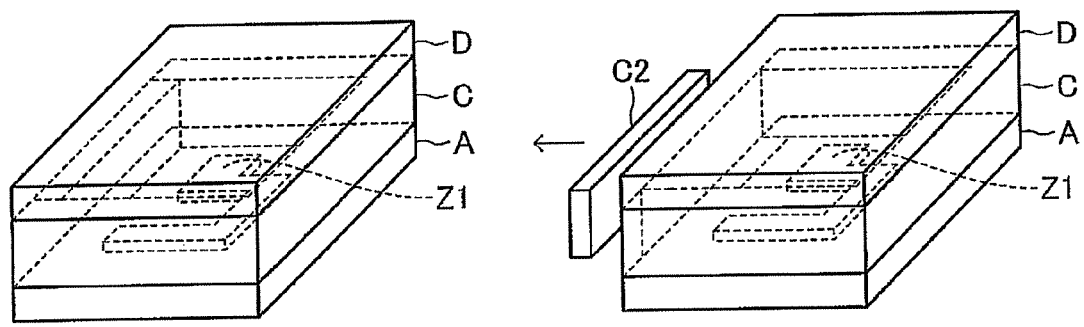
FIG. 18 Second view for explaining a step of producing the molded body shown in FIG. 15.
Figure 18:
Figure 18:
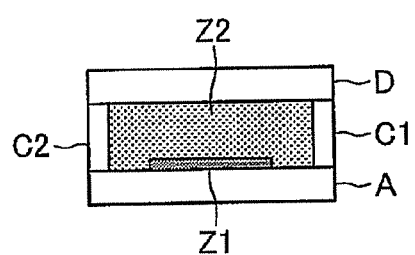
Figure 18:
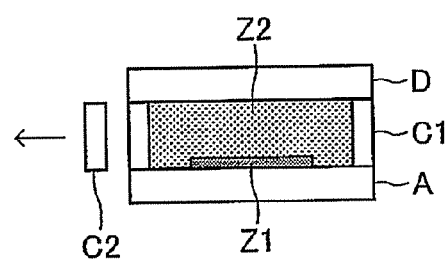
Figure 19:
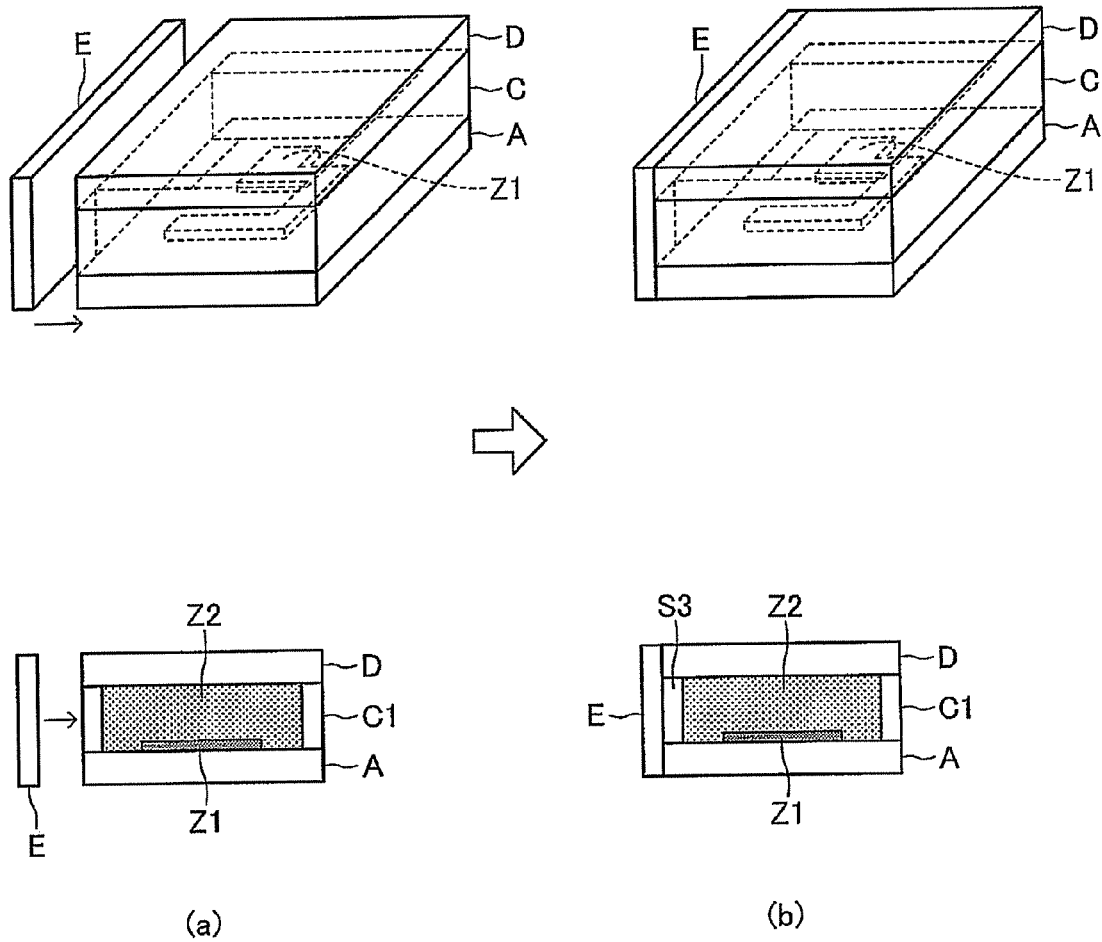
FIG. 19 Third view for explaining a step of producing the molded body shown in FIG. 15.
Figure 20:
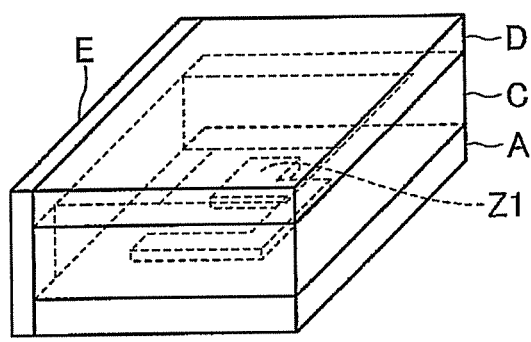
FIG. 20 Fourth view for explaining a step of producing the molded body shown in FIG. 15.
Figure 20:
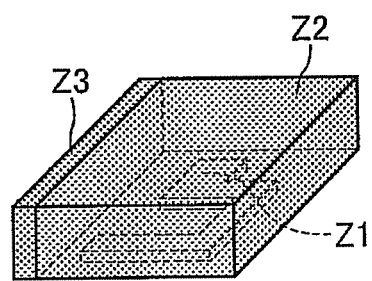
Figure 20:
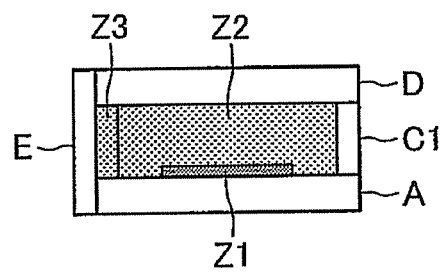
Figure 20:
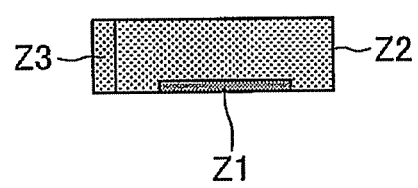

A method for producing the molded body 10 according to the second embodiment shown in FIGS. 15 and 16 will be described briefly with reference to FIGS. 17 to 20. A mold A corresponds to the "first mold"; a mold B corresponds to the "second mold"; molds C and D correspond to the "third mold"; and a mold E corresponds to the "fourth mold" (the same is applied to the modified embodiments to be described later).

First, similar to the case of the first embodiment described above, the first molded body Z1 is formed on the mold A by the gel-casting process shown in FIGS. 4 and 5.

Next, as shown in FIGS. 17(a) and 17(b) corresponding to FIGS. 6(a) and 6(b), the molds C and D are placed (overlaied) sequentially on the upper surface of the mold A on which the first molded body Z1 is formed. Subsequently, as shown in FIG. 18(a) corresponding to FIG. 7(a), the second material slurry is filled into the second mold cavity S2 defined by the "molding surfaces" of the molds A, C, and D and is then cured and molded. In this manner, similar to the case of the first embodiment described above, the second molded body Z2 is formed by the gel-casting process.

Next, as shown in FIG. 18(b), only a second portion C2 of the mold C (corresponding to a portion of the aforementioned "third mold") is removed. Subsequently, as shown in FIGS. 19(a) and 19(b), a thin rectangular-parallelepiped mold E is attached to a side surface of a piled assembly of the molds A, C1, and D. This forms a third mold cavity S3 defined by the "molding surfaces" of the molds A, D, and E and a side surface of the second molded body Z2. The third mold cavity S3 has the same shape as that of the third molded part 13.

Next, as shown in FIG. 20(a), a third material slurry is filled into the third mold cavity S3. The third material differs in material from the first and second materials. By this procedure, the third material slurry is molded in such a manner as to have the same shape as that of the third molded part 13 and to come into contact with the second molded body Z2. The molded third material slurry is caused to set through curing reaction effected by the gelling agent. In this manner, by means of the gel-casting process, a third molded body Z3 is formed in the third mold cavity S3 in such a condition as to be bonded to the side surface of the second molded body Z2.

All of the molds are removed from a bonded body consisting of the first to third molded bodies Z1 to Z3, thereby yielding the bonded body singly as shown in FIG. 20(b). FIG. 20(b) shows the bonded body shown in FIG. 15, in a vertically inverted manner. The bonded body is subjected to the aforementioned drying process. As a result, the first to third molded bodies Z1 to Z3 are dried to become the first to third molded parts 11, 12, and 13, respectively. That is, as shown in FIG. 15, there is yielded the "molded body 10 in which the first molded part 11 is embedded in the upper surface of the second molded part 12, and the third molded part 13 is bonded to the side surface of the second molded part 12."

(First Modification of the Second Embodiment)

Next, a first modification of the above-described second embodiment will be briefly described with reference to FIGS. 21 to 26 corresponding to FIGS. 15 to 20. The first modification differs from the second embodiment only in that the first molded part 11 is embedded in each of the upper and lower surfaces of the second molded part 12 and that the embedded positions of the first molded parts 11 are displaced toward the third molded part 13 such that the third molded part 13 is bonded to the side surfaces of the first and second molded parts 11 and 12.

As shown in FIGS. 23(a) and 23(b), in order to embed the first molded parts 11 in the upper and lower surfaces, respectively, of the second molded part 12, a producing method of the first modification uses the mold A having the first molded body Z1 formed on its lower surface in place of the mold D. That is, in the second mold cavity S2, the paired first molded bodies Z1 are disposed apart from each other in such a manner as to vertically face each other.

Figure 21:
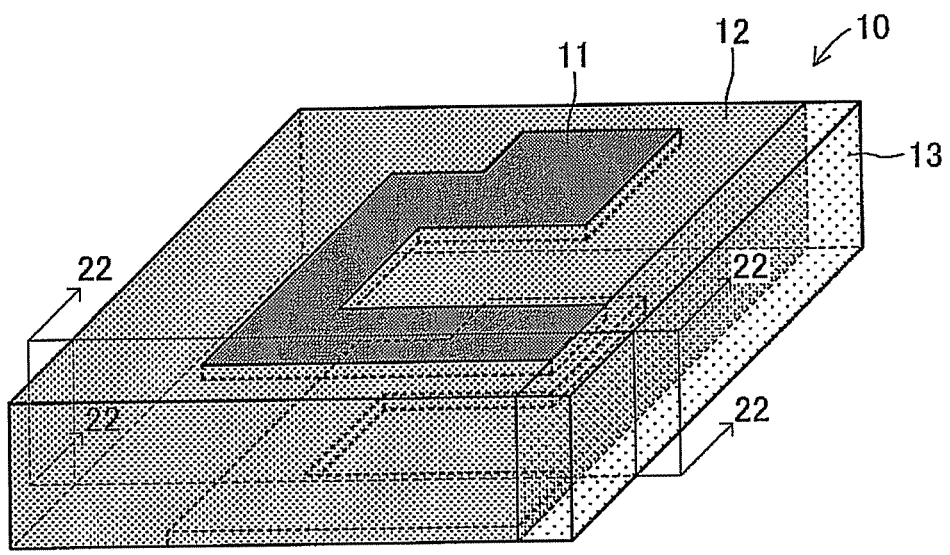
FIG. 21 View, corresponding to FIG. 1, showing a molded body according to a first modification of the second embodiment of the present invention.
Figure 22:
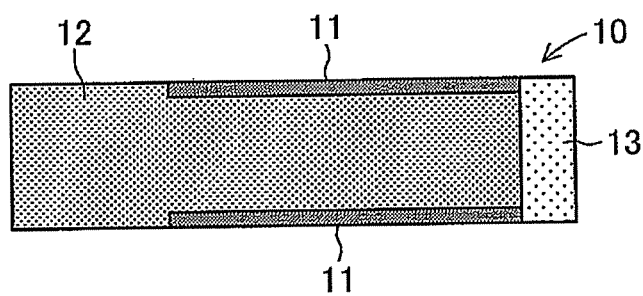
FIG. 22 Sectional view showing the molded body taken along line 22-22 of FIG. 21.
Figure 23:
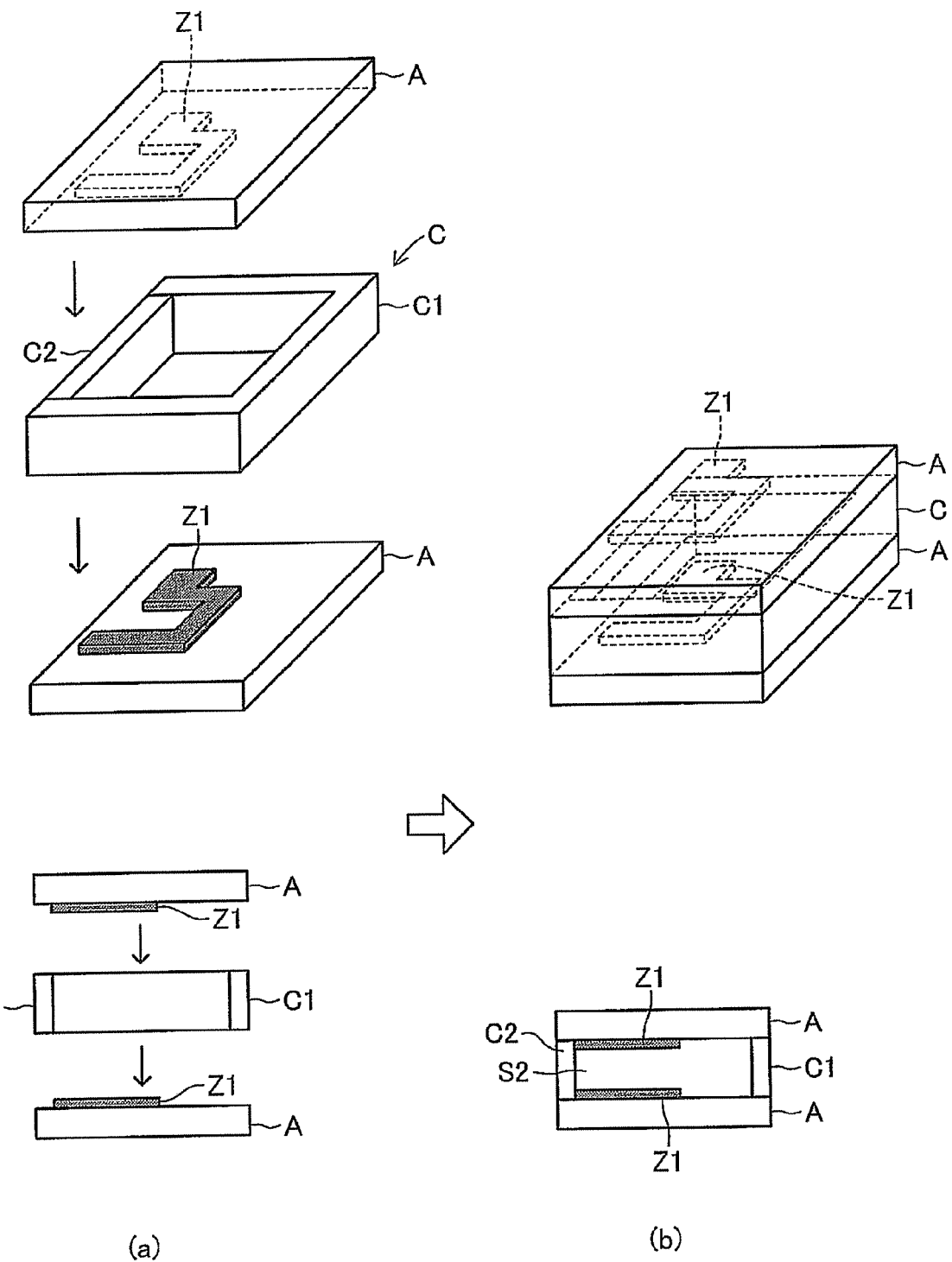
FIG. 23 First view for explaining a step of producing the molded body shown in FIG. 21.
Figure 24:
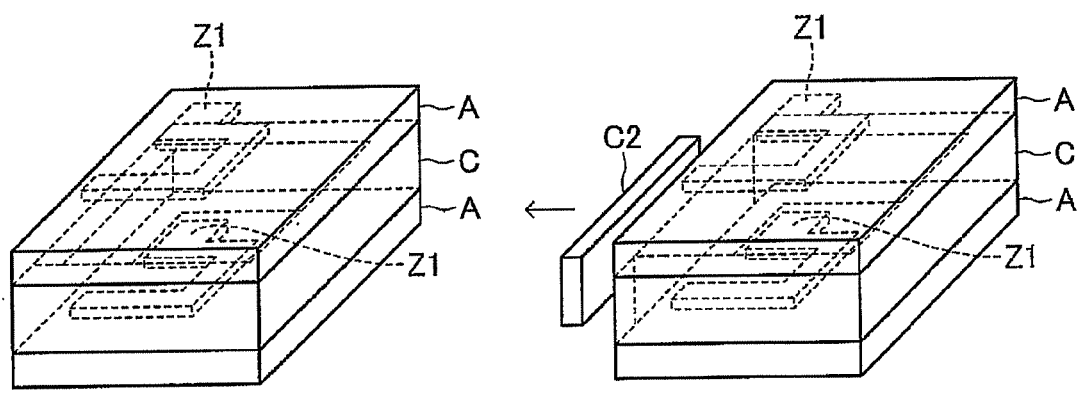
FIG. 24 Second view for explaining a step of producing the molded body shown in FIG. 21.
Figure 24:
Figure 24:
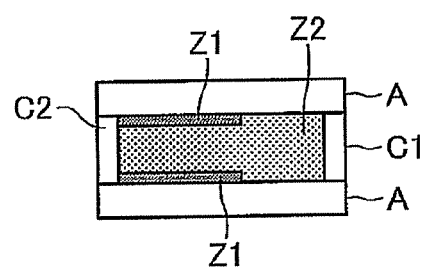
Figure 24:
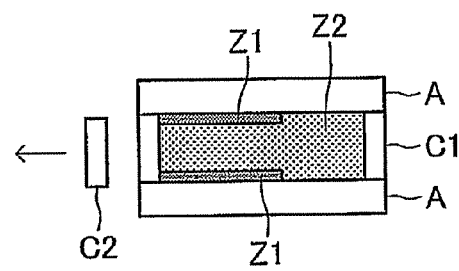
Figure 25:
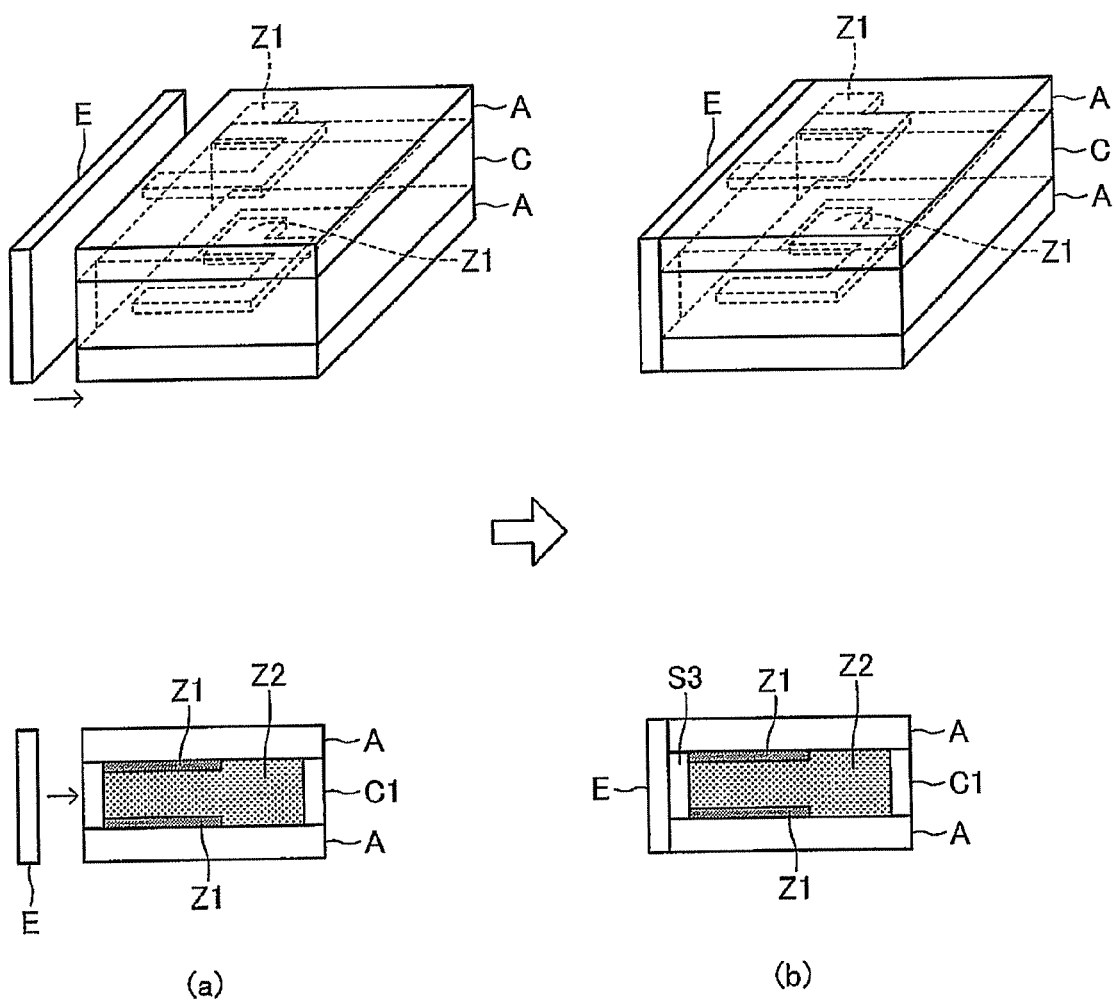
FIG. 25 Third view for explaining a step of producing the molded body shown in FIG. 21.
Figure 26:
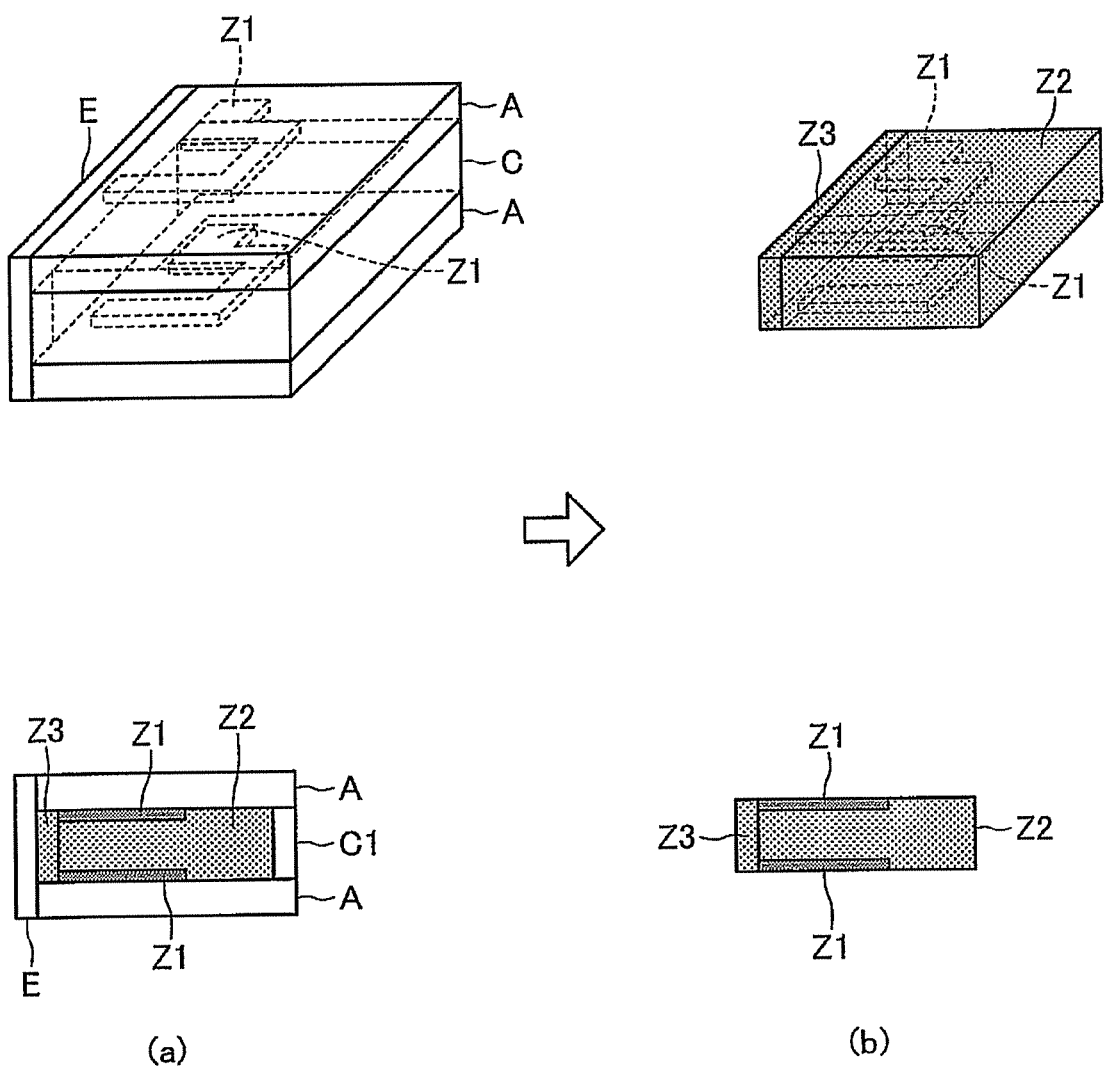
FIG. 26 Fourth view for explaining a step of producing the molded body shown in FIG. 21.

Since other features of the producing method of the first modification are similar to those of the above-described producing method of the second embodiment, repeated, detailed description thereof is omitted. Thus, as shown in FIG. 21, there is yielded "the molded body 10 in which the first molded part 11 is embedded in each of the upper and lower surfaces of the second molded part 12, and the third molded part 13 is bonded to the side surfaces of the first and second molded parts 11 and 12."

(Second Modification of the Second Embodiment)

Next, a second modification of the above-described second embodiment will be briefly described with reference to FIGS. 27 to 32 corresponding to FIGS. 15 to 20. The second modification differs from the second embodiment only in that the first molded part 11 is embedded in each of the upper and lower surfaces of the second molded part 12 and that a rectangular-parallelepiped hollow space 12a is formed in the second molded part 12 at a location adjacent to the third molded part 13. Although unillustrated, in actuality, in order to restrain an increase in inner pressure at the time of debindering and firing, a hole is provided for establishing communication between the hollow space 12a and the outside atmosphere.

As shown in FIGS. 29(a) and 29(b), in order to embed the first molded parts 11 in the upper and lower surfaces, respectively, of the second molded part 12, similar to the case of the above-described first modification, a producing method of the second modification uses the mold A having the first molded body Z1 formed on its lower surface in place of the mold D.

In the producing method of the second modification, in order to form the hollow space 12a, as shown in FIGS. 29(a) and 29(b), the molding surface of the second portion C2 of the mold C has a protrusion C2a, which has the same shape as that of the hollow space 12a, formed thereon. Thus, as shown in FIGS. 30(a) and 30(b), a recess Z2a corresponding to the hollow space 12a is formed in the side surface of the second molded body Z2.

According to the producing method of the second modification, in order to form the third mold cavity S3 corresponding to the third molded part 13 such that the third mold cavity S3 is located adjacent to the recess Z2a, as shown in FIGS. 31(a) and 31(b), the molding surface of the mold E has a recess Ea, which has the same shape as that of the third molded part 13, formed therein.

When the third material slurry is to be injected into the thus-formed third mold cavity S3, as shown in FIGS. 31(a) and 31(b) and FIG. 32(a), an assembly of the molds is placed in such an orientation that the mold E comes to the bottom of the assembly. By this arrangement, the recess Z2a is located above the third mold cavity S3. Therefore, when the third material slurry is injected into the third mold cavity S3, the action of gravity is utilized as follows: while the entry of the third material slurry into the recess Z2a is prevented, the third mold cavity S3 (more specifically, the recess Ea) can be filled with the third material slurry.

Figure 27:
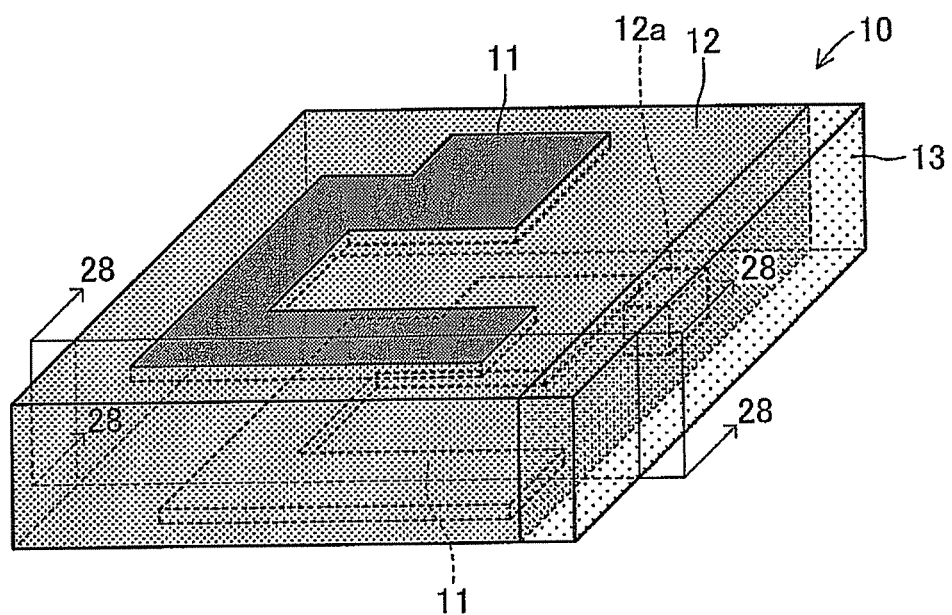
FIG. 27 View, corresponding to FIG. 1, showing a molded body according to a second modification of the second embodiment of the present invention.
Figure 28:
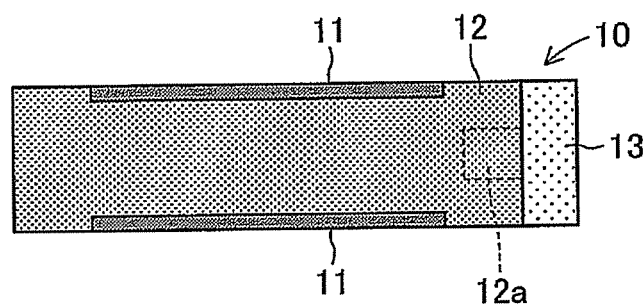
FIG. 28 Sectional view showing the molded body taken along line 28-28 of FIG. 27.
Figure 29:
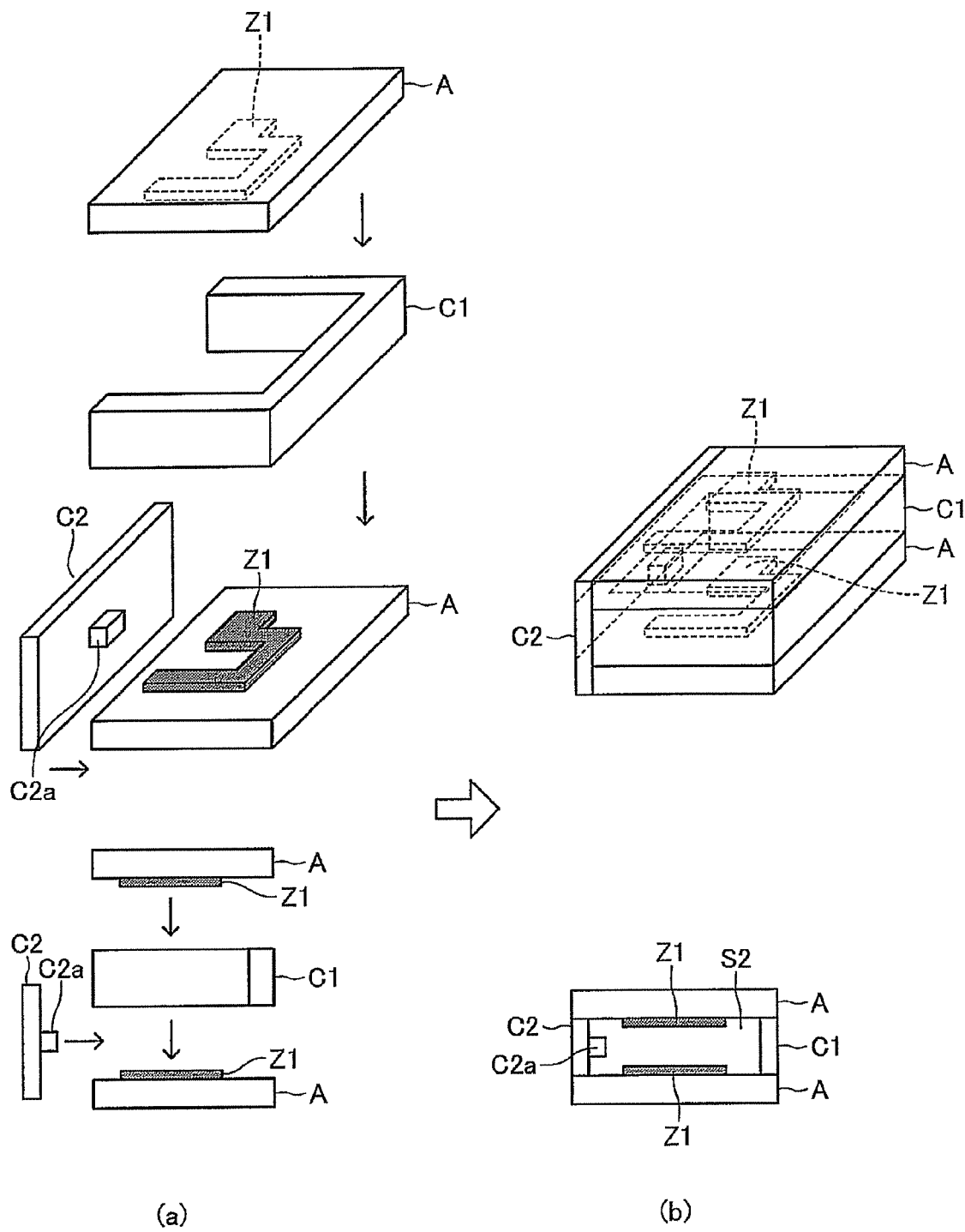
FIG. 29 First view for explaining a step of producing the molded body shown in FIG. 27.
Figure 30:
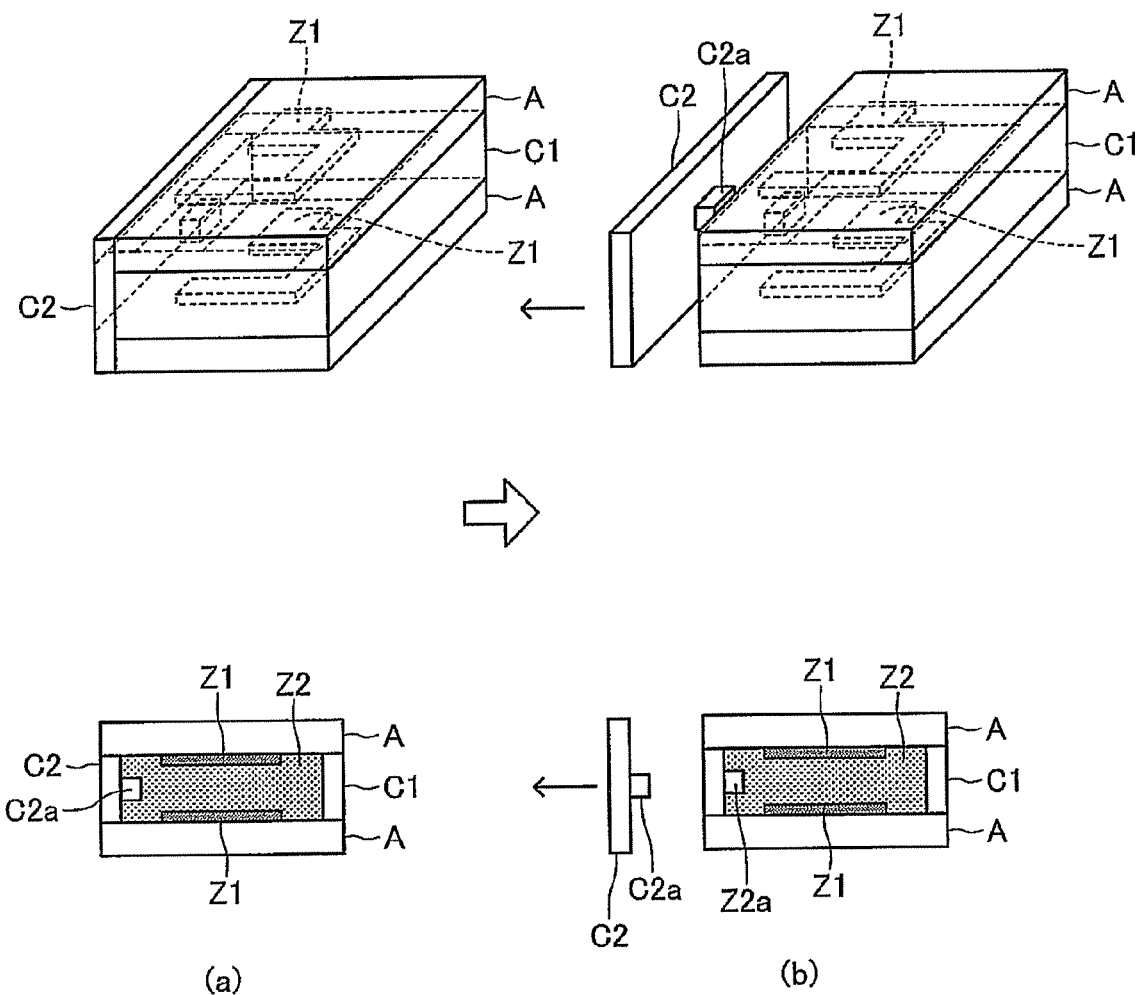
FIG. 30 Second view for explaining a step of producing the molded body shown in FIG. 27.
Figure 31:
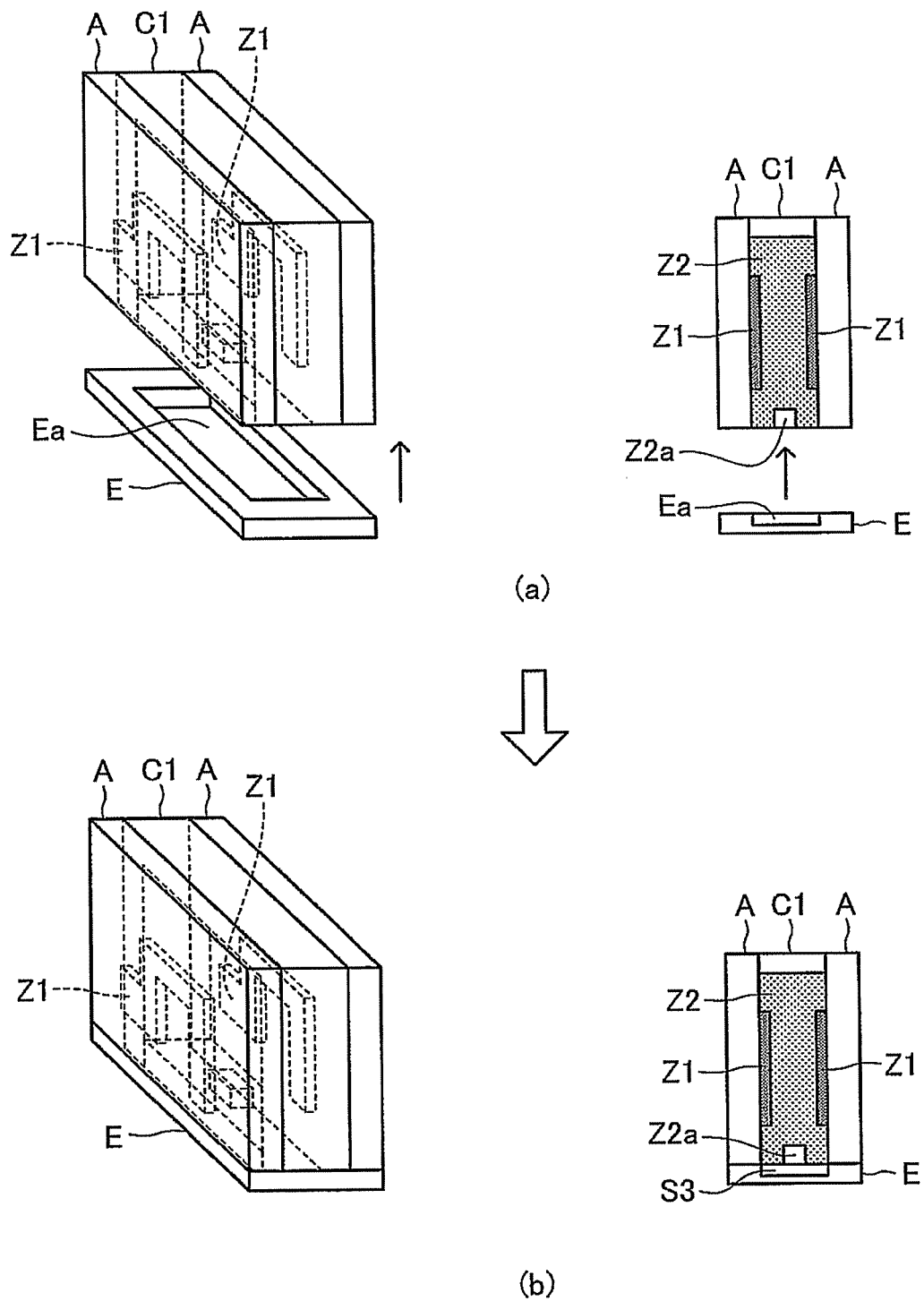
FIG. 31 Third view for explaining a step of producing the molded body shown in FIG. 27.
Figure 32:
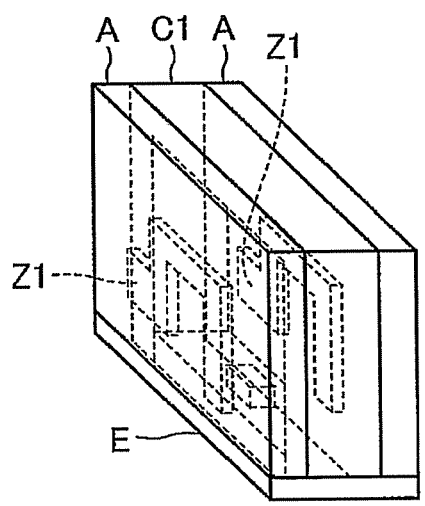
FIG. 32 Fourth view for explaining a step of producing the molded body shown in FIG. 27.
Figure 32:
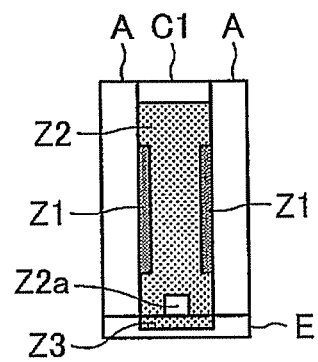
Figure 32:
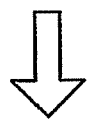
Figure 32:
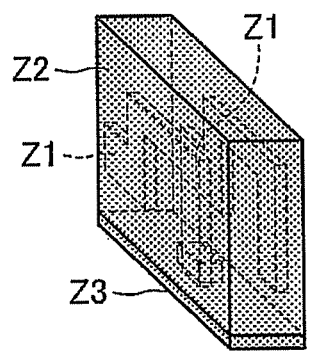
Figure 32:
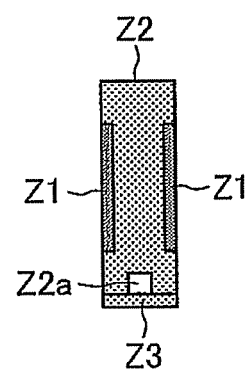

Since other features of the producing method of the second modification are similar to those of the above-described producing method of the second embodiment, repeated, detailed description thereof is omitted. Thus, as shown in FIG. 27, there is yielded "the molded body 10 in which the first molded part 11 is embedded in each of the upper and lower surfaces of the second molded part 12, the third molded part 13 is bonded to the side surface of the second molded part 12, and the hollow space 12a is formed within the second molded part 12."

In the second modification, the two first molded parts 11 may be eliminated. In this case, the second molded part 12 and the third molded part 13 correspond to the "first molded part" and the "second molded part," respectively, in the present invention.

The present invention is not limited to the above-described embodiments and modifications, but may be modified in various other forms without departing from the scope of the invention. For example, in the above-described first embodiment, the first and second molded parts 11 and 12 are formed by filling the corresponding mold cavities with the corresponding material slurries which contain a gelling agent. However, the first and second molded parts 11 and 12 may be formed through application, by printing, of the corresponding material slurries (pastes) which contain a gelling agent. The same is applied to the third molded part 13 in the second embodiment and its first and second modifications described above.

In the above-described first embodiment, in order to use a fired body yielded by firing the molded body 10 as a ceramic wiring substrate, the first and second molded parts 11 and 12 are "a precursor of conductor," which will become a conductor later, and "a precursor of insulator," which will become an insulator later, respectively. However, materials of the first and second molded parts may be in any combination so long as material powders to be used differ in material. Similarly, in the second embodiment and its first and second modifications described above, materials of the first, second, and third molded parts may be in any combination so long as material powders differ in material.

In the above-described embodiments and modifications, by means of the upper surface (molding surface) of the mold A being a "planar surface," there is yielded the molded body 10 having a "planar surface" having a region where the first molded part 11 is exposed, and a region where the second molded part 12 is exposed. In this connection, in the case where the upper surface (molding surface) of the mold A is a "curved surface," there is yielded the molded body having a "curved surface" having a region where the first molded part 11 is exposed, and a region where the second molded part 12 is exposed.

The invention claimed is:

1. A molded body comprising:
   a first molded part formed by molding and hardening, by gel casting, a first material slurry which contains a first material powder, a dispersant, and a gelling agent, and by causing the molded first material slurry to set; and
   a second molded part bonded to the already hardened first molded part and formed by molding and hardening, by gel casting, a second material slurry which contains a second material powder different from the first material powder, a dispersant, and a gelling agent, and by causing the molded second material slurry to set,
   wherein the molded body has a planar surface or a curved surface having a region where the first molded part is exposed, and a region where the second molded part is exposed, and
   the molded body has a difference in level on the planar or curved surface in a region corresponding to a boundary between the first and second molded parts, and the difference in level is 13 times to 20 times a median diameter of particles of the first material powder contained in the first molded part or a median diameter of particles of the second material powder contained in the second molded part, whichever is greater.

2. A molded body comprising:
   a first molded part formed by molding and hardening, by gel casting, a first material slurry which contains a first material powder, a dispersant, and a gelling agent, and by causing the molded first material slurry to set; and
   a second molded part bonded to the already hardened first molded part and formed by molding and hardening, by gel casting, a second material slurry which contains a second material powder different from the first material powder, a dispersant, and a gelling agent, and by causing the molded second material slurry to set,
   wherein the molded body has a planar surface or a curved surface having a region where the first molded part is exposed, and a region where the second molded part is exposed, and
   the molded body has a difference in level on the planar or curved surface in a region corresponding to a boundary between the first and second molded parts, and the difference in level is 3 times to 6 times a roughness parameter Rz of a region, corresponding to the first molded part, of the planar or curved surface or a roughness parameter Rz of a region, corresponding to the second molded part, of the planar or curved surface, whichever is greater.

3. A molded body according to claim 1, wherein a molded body comprising:
   a third molded part bonded to one or both of the first and second molded parts and formed by molding a third material slurry which contains a third material powder different from the first and second material powders, a dispersant, and a gelling agent, and by causing the molded third material slurry to set.

4. A molded body according to claim 3, wherein:
the third molded part is bonded to a side surface of a bonded body consisting of the first and second molded parts, the side surface being different from the planar surface or the curved surface.

5. A molded body according to claim 2, wherein a molded body comprising:
a third molded part bonded to one or both of the first and second molded parts and formed by molding a third material slurry which contains a third material powder different from the first and second material powders, a dispersant, and a gelling agent, and by causing the molded third material slurry to set.

6. A molded body according to claim 5, wherein:
the third molded part is bonded to a side surface of a bonded body consisting of the first and second molded parts, the side surface being different from the planar surface or the curved surface.

7. A molded body of claim 1, wherein the gelling agent is polymethylene polyphenyl polyisocyanate.

8. A molded body of claim 2, wherein the gelling agent is polymethylene polyphenyl polyisocyanate.

\* \* \* \* \*